United States Patent
Zhang et al.

(10) Patent No.: US 10,863,495 B2
(45) Date of Patent: Dec. 8, 2020

(54) PUSCH TRANSMISSION METHOD AND DEVICE, AND DCI INDICATION METHOD AND DEVICE

(71) Applicant: ZTE CORPORATION, Guangdong (CN)

(72) Inventors: Wen Zhang, Shenzhen (CN); Shuqiang Xia, Shenzhen (CN); Wenfeng Zhang, Shenzhen (CN); Jing Shi, Shenzhen (CN); Xianghui Han, Shenzhen (CN); Chunli Liang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 18 days.

(21) Appl. No.: 16/338,210

(22) PCT Filed: Sep. 21, 2017

(86) PCT No.: PCT/CN2017/102795
§ 371 (c)(1),
(2) Date: Jul. 1, 2019

(87) PCT Pub. No.: WO2018/059305
PCT Pub. Date: Apr. 5, 2018

(65) Prior Publication Data
US 2020/0029309 A1    Jan. 23, 2020

(30) Foreign Application Priority Data
Sep. 30, 2016  (CN) .......................... 2016 1 0879465

(51) Int. Cl.
*H04W 72/04*    (2009.01)
*H04L 5/00*     (2006.01)
*H04W 72/14*    (2009.01)

(52) U.S. Cl.
CPC ......... *H04W 72/042* (2013.01); *H04L 5/0048* (2013.01); *H04W 72/14* (2013.01); *H04L 5/0005* (2013.01); *H04W 72/0446* (2013.01)

(58) Field of Classification Search
CPC ............ H04W 72/0446; H04W 72/042; H04L 5/0055
See application file for complete search history.

(56) References Cited

U.S. PATENT DOCUMENTS 10,575,302 B2 *  2/2020  Sahlin .................. H04L 5/003

FOREIGN PATENT DOCUMENTS

| CN | 102332970 A  | 1/2012 |
| EP | 3 500 008 A1 | 6/2019 |

(Continued)

OTHER PUBLICATIONS

Huawai, Hisilicon, "Details of two-level DCI schemes for short TTI," 3GPP TSG-RAN WG1 Meeting #86, R1-166149, Gothenburg, Sweden, Aug. 22-26, 2016.

(Continued)

*Primary Examiner* — Chandrahas B Patel
(74) *Attorney, Agent, or Firm* — Foley & Lardner LLP

(57) ABSTRACT

Provided are a method and device for transmitting a PUSCH, a DCI indication method and device, a terminal, and a base station. The method for transmitting a PUSCH includes: determining a transmission manner of the PUSCH according to at least one of an indication of first DCI received from a base station or a first preset condition; and transmitting the PUSCH in the determined transmission manner.

16 Claims, 4 Drawing Sheets

(56) References Cited

FOREIGN PATENT DOCUMENTS

EP          3 522 653  A1    8/2019
WO    WO-2014/098402  A1    6/2014
WO    WO-2016/107472  A1    7/2016

OTHER PUBLICATIONS

Intel Corporation, "Configuration and Signaling for UE-specific PUSCH DM-RS," 3GPP TSG-RAN WG1 Meeting #69, R1-122635, Prague, Czech Republic, May 21-25, 2012.
Internatonal Search Report and Written Opinion for International Appl. No. PCT/CN2017/102795, dated Dec. 7, 2017.
Qualcomm Incorporated, "DCI design for PUSCH scheduling in eLAA," 3GPP TSG RAN WG1 #85, R1-164410, Nanjing, China, May 23-27, 2016.
European Search Report for EP Appl. No. 17854755.0, dated Apr. 28, 2020.

\* cited by examiner

PUSCH TRANSMISSION METHOD AND DEVICE, AND DCI INDICATION METHOD AND DEVICE

CROSS REFERENCE TO RELATED APPLICATIONS

This is a U.S. National Stage Application, under 35 U.S.C. 371, of International Patent Application No. PCT/CN2017/102795, filed on Sep. 21, 2017, which claims priority to Chinese Patent Application No. 201610879465.8 filed on Sep. 30, 2016, the contents of both of which are incorporated herein by reference in their entireties.

TECHNICAL FIELD

The present invention relates to the field of communications and, in particular, to a method and device for transmitting a physical uplink shared channel (PUSCH), and a downlink control information (DCI) indication method and device.

BACKGROUND

The rapid developments of mobile Internet and the Internet of Things have led to the explosive growth and diversification of data traffic and the extensive rise of differentiated traffic. Compared with 4G, 5G, as a new generation of mobile communication technology, will support a higher rate (Gbps), massive links (1 M/Km2), a ultra-low delay (1 ms), higher reliability, and hundredfold energy efficiency improvement to support the new requirement changes. Among them, the ultra-low delay, as a key index of the 5G technology, directly affects the development of delay-limited services such as the Internet of Vehicles, industrial automation, remote control and a smart grid. At present, researches on a series of standards on reducing the 5G delay are gradually developed.

Currently, reduction of the transmission time interval (TTI) is an important research direction for reducing the delay, and aims to reduce the current TTI length from 1 ms to 0.5 ms or even to 1 to 2 orthogonal frequency division multiplexing (OFDM) symbols, which greatly reduces the minimum scheduling time and further greatly reduces the single transmission delay without changing the frame structure. The 3rd Generation Partnership (3GPP) has set a project for studying the TTI delay reduction (short TTI) technology.

SUMMARY

The following is a summary of the subject matter described herein in detail. This summary is not intended to limit the scope of the claims.

Embodiments of the present invention provide a method and device for transmitting a PUSCH, and a DCI indication method and device.

An embodiment of the present invention provides a method for transmitting a PUSCH. The method includes the steps described below.

A transmission manner of the PUSCH is determined according to at least one of an indication of first downlink control information (DCI) received from a base station or a first preset condition.

The PUSCH is transmitted in the determined transmission manner.

Alternatively, the indication of the first DCI includes:
a first indication, indicating transmitting a reference signal on a specified TTI; or
a second indication, indicating that not transmitting the reference signal on the specified TTI; or
a third indication, indicating transmitting the PUSCH on the specified TTI; or
a fourth indication, indicating transmitting the reference signal on a specified symbol.

Alternatively, in response to determining that the indication of the first DCI is the first indication, determining that the transmission manner of the PUSCH includes: the reference signal is to be transmitted on the specified TTI.

Alternatively, in response to determining that the indication of the first DCI is the second indication, the determining the transmission manner of the PUSCH includes: determining the transmission manner of the PUSCH according to the first preset condition.

Alternatively, the determining the transmission manner of the PUSCH according to the first preset condition includes:
in response to determining that a PUSCH was transmitted within a time window previous to the specified TTI, determining that the transmission manner of the PUSCH includes: no reference signal is to be transmitted on the specified TTI; and in response to determining that no PUSCH was transmitted within the time window previous to the specified TTI, determining that the transmission manner of the PUSCH includes: the reference signal is to be transmitted on the specified TTI, or neither the reference signal nor data is to be transmitted on the specified TTI.

Alternatively, the determining the transmission manner of the PUSCH according to the first preset condition further includes:
in response to determining that the reference signal was transmitted within a time window previous to the specified TTI, determining that the transmission manner of the PUSCH includes: no reference signal is to be transmitted on the specified TTI; and in response to determining that the reference signal was not transmitted within the time window previous to the specified TTI, determining that the transmission manner of the PUSCH includes: the reference signal is to be transmitted on the specified TTI, or neither the reference signal nor data is to be transmitted on the specified TTI.

Alternatively, the determining the transmission manner of the PUSCH according to the first preset condition further includes:
in response to determining that an uplink grant sent by the base station was received within a time window previous to a TTI where the first DCI is located, determining that the transmission manner of the PUSCH includes: no reference signal is to be transmitted on the specified TTI; and in response to determining that the uplink grant sent by the base station was not received within the time window previous to the TTI where the first DCI is located, determining that the transmission manner of the PUSCH includes: the reference signal is to be transmitted on the specified TTI, or neither the reference signal nor data is to be transmitted on the specified TTI.

Alternatively, the determining the transmission manner of the PUSCH according to the first preset condition further includes the following:
in response to determining that an uplink grant sent by the base station was received within a time window previous to a TTI where the first DCI is located and at least one of the uplink grant includes the first indication, determining that the transmission manner of the PUSCH includes: no reference signal is to be transmitted on the specified TTI; and in response to determining that the uplink grant sent by the base station was not received within the time window previous to the TTI where the first DCI is located or in response to determining that that at least one uplink grant sent by the base station was received and all of the at least one uplink grant includes the second indication, determining that the transmission manner of the PUSCH includes: the reference signal is to be transmitted on the specified TTI, or neither the reference signal nor data is to be transmitted on the specified TTI.

Alternatively, in response to determining that the indication of the first DCI is the third indication, the determining the transmission manner of the PUSCH includes: determining the transmission manner of the PUSCH according to the first preset condition.

Alternatively, the determining the transmission manner of the PUSCH according to the first preset condition includes the following:

in response to determining that no PUSCH was transmitted within a time window previous to the specified TTI, determining that the transmission manner of the PUSCH includes that the reference signal is to be transmitted on the specified TTI.

Alternatively, the determining the transmission manner of the PUSCH according to the first preset condition further includes the following:

in response to determining that a PUSCH was transmitted within a time window previous to the specified TTI, in response to determining that an indication bit in the first DCI is flipped with respect to an indication bit in second DCI within the time window previous to the specified TTI, determining that the transmission manner of the PUSCH includes: the reference signal is to be transmitted on the specified TTI, where the second DCI corresponds to a PUSCH transmitted within the time window previous to the specified TTI and closest to the specified TTI; and in response to determining that the indication bit in the first DCI is not flipped with respect to the indication bit in the second DCI within the time window previous to the specified TTI, determining that the transmission manner of the PUSCH includes: no reference signal is to be transmitted on the specified TTI, or neither the reference signal nor data is to be transmitted on the specified TTI.

Alternatively, the determining the transmission manner of the PUSCH according to the first preset condition further includes the following:

in response to determining that a PUSCH was transmitted within a time window previous to the specified TTI, in response to determining that an indication bit in the first DCI is flipped with respect to an indication bit in third DCI within the time window previous to the specified TTI, determining that the transmission manner of the PUSCH includes: no reference signal is to be transmitted on the specified TTI, or neither the reference signal nor data is to be transmitted on the specified TTI; where the third DCI corresponds to a PUSCH transmitted within the time window previous to the specified TTI and closest to the specified TTI; and in response to determining that the indication bit in the first DCI is not flipped with respect to the indication bit in the third DCI within the time window previous to the specified TTI, determining that the transmission manner of the PUSCH includes: the reference signal is to be transmitted on the specified TTI.

Alternatively, the determining the transmission manner of the PUSCH according to the first preset condition further includes the following:

in response to determining that no uplink grant sent by the base station was received within a time window previous to a TTI where the first DCI is located, determining that the transmission manner of the PUSCH includes: the reference signal is to be transmitted on the specified TTI.

Alternatively, the step of determining the transmission manner of the PUSCH according to the first preset condition further includes the following:

in response to determining that an uplink grant sent by the base station was received within a time window previous to a TTI where the first DCI is located, in response to determining that an indication bit in the first DCI is flipped with respect to an indication bit in fourth DCI within the time window previous to the TTI where the first DCI is located, determining that the transmission manner of the PUSCH includes: no reference signal is to be transmitted on the specified TTI, where the fourth DCI is an uplink grant received within the time window and closest to the TTI where the first DCI is located; and in response to determining that the indication bit in the first DCI is not flipped with respect to the indication bit in the fourth DCI within the time window previous to the TTI where the first DCI is located, determining that the transmission manner of the PUSCH includes: no reference signal is to be transmitted on the specified TTI, or neither the reference signal nor data is to be transmitted on the specified TTI.

Alternatively, the determining the transmission manner of the PUSCH according to the first preset condition further includes the following:

in response to determining that an uplink grant sent by the base station was received within a time window previous to a TTI where the first DCI is located, in response to determining that an indication bit in the first DCI is flipped with respect to an indication bit in fifth DCI within the time window previous to the TTI where the first DCI is located, determining that the transmission manner of the PUSCH includes: no reference signal is to be transmitted on the specified TTI, or neither the reference signal nor data is to be transmitted on the specified TTI; where the fifth DCI is an uplink grant received within the time window and closest to the TTI where the first DCI is located; and in response to determining that the indication bit in the first DCI is not flipped with respect to the indication bit in the fifth DCI within the time window previous to the TTI where the first DCI is located, determining that the transmission manner of the PUSCH includes: no reference signal is to be transmitted on the specified TTI.

Alternatively, the determining the transmission manner of the PUSCH according to the first preset condition further includes the following:

in response to determining that the specified TTI includes a candidate demodulation reference signal (DMRS) time domain position, determining that the transmission manner of the PUSCH includes: the reference signal is to be transmitted at the candidate DMRS time domain position.

Alternatively, the determining the transmission manner of the PUSCH according to the first preset condition further includes the following:

in response to determining that the specified TTI includes no candidate DMRS time domain position, in response to determining that the reference signal was transmitted within a time window previous to the specified TTI, determining that the transmission manner of the PUSCH includes: no reference signal is to be transmitted on the specified TTI; and in response to determining that no reference signal was transmitted within the time window previous to the specified TTI, determining that the transmission manner of the PUSCH includes: the reference signal is to be transmitted on the specified TTI, or neither the reference signal nor data is to be transmitted on the specified TTI.

Alternatively, the determining the transmission manner of the PUSCH according to the first preset condition further includes the following:

in response to determining that the specified TTI includes no candidate DMRS time domain position, determining that the transmission manner of the PUSCH includes: no reference signal is to be transmitted on the specified TTI.

Alternatively, the candidate DMRS time domain position is specified according to at least one of: a predefined setting or a configuration by the base station.

Alternatively, in response to determining that the indication of the first DCI is the fourth indication, the determining the transmission manner of the PUSCH includes: determining the transmission manner of the PUSCH according to the first preset condition.

Alternatively, the determining the transmission manner of the PUSCH according to the first preset condition includes the following:

in response to determining that the specified symbol is before a first data transmission symbol, in response to determining that a time interval between the specified symbol and the first data transmission symbol exceeds a first threshold, determining that the transmission manner of the PUSCH includes: the reference signal is not to be transmitted on the specified symbol and is to be transmitted on at least one data transmission symbol; or the reference signal is not to be transmitted on the specified symbol and no data is to be transmitted on data transmission symbols.

The first threshold includes one of: N1 TTIs, N2 uplink TTIs, N3 downlink TTIs or N4 symbols, where N1, N2, N3 and N4 are all positive integers.

Alternatively, the determining the transmission manner of the PUSCH according to the first preset condition further includes the following:

in response to determining that a time interval between a TTI where the first DCI is located and the specified symbol is less than a second threshold, determining that the transmission manner of the PUSCH includes: the reference signal is not to be transmitted on the specified symbol and is to be transmitted on at least one data transmission symbol; or the reference signal is not to be transmitted on the specified symbol and is not to be transmitted on data transmission symbols.

The second threshold includes one of: M1 TTIs, M2 uplink TTIs, M3 downlink TTIs or M4 symbols, where M1, M2, M3 and M4 are all positive integers.

Alternatively, the time window includes at least one of K1 TTIs, K2 uplink TTIs, K3 downlink TTIs or K4 symbols, where K1, K2, K3 and K4 are all positive integers.

In another aspect, an embodiment of the present invention further provides a downlink control information (DCI) indication method. The method includes the steps described below.

Content of sixth DCI is determined according to a second preset condition, where the sixth DCI is used for instructing a terminal to transmit a physical uplink shared channel (PUSCH) in a specified transmission manner.

The determined sixth DCI is transmitted to the terminal.

Alternatively, the step in which the content of the sixth DCI is determined according to the second preset condition includes:

in response to determining that no uplink grant was transmitted to the terminal within a first time window, determining that the content of the sixth DCI includes: instructing the terminal to transmit a reference signal on a specified transmission time interval (TTI); where the uplink grant is used for instructing the terminal to transmit a PUSCH and the first time window is previous to the specified TTI;

in response to determining that at least one uplink grant was transmitted to the terminal within the first time window and all of the at least one uplink grant instructs the terminal not to transmit the reference signal, determining that the content of the sixth DCI includes: instructing the terminal to transmit the reference signal on the specified TTI; and in response to determining that the at least one uplink grant was transmitted to the terminal within the first time window and at least one of the at least one uplink grant instructs the terminal to transmit the reference signal, determining that the content of the sixth DCI includes: instructing the terminal not to transmit the reference signal on the specified TTI.

Alternatively, the step in which the content of the sixth DCI is determined according to the second preset condition includes:

in response to determining that no uplink grant was transmitted to the terminal within a second time window, determining that the content of the sixth DCI includes: instructing the terminal to transmit a reference signal on a specified TTI; where the second time window is previous to a TTI where the sixth DCI is located and the uplink grant is used for instructing the terminal to transmit a PUSCH;

in response to determining that at least one uplink grant was transmitted to the terminal within the second time window and all of the at least one uplink grant instructs the terminal not to transmit the reference signal, determining that the content of the sixth DCI includes: instructing the terminal to transmit the reference signal on the specified TTI; and in response to determining that at least one uplink grant was transmitted to the terminal within the second time window and at least one of the at least one uplink grant instructs the terminal to transmit the reference signal, determining that the content of the sixth DCI includes: instructing the terminal not to transmit the reference signal on the specified TTI.

In another aspect, an embodiment of the present invention further provides a device for transmitting a PUSCH. The device includes a first determining module and a first transmitting module The first determining module is configured to determine a transmission manner of the PUSCH according to at least one of an indication of first downlink control information (DCI) received from a base station or a first preset condition.

The first transmitting module is configured to transmit the PUSCH in the determined transmission manner.

Alternatively, the indication of the first DCI includes:

a first indication, indicating transmitting a reference signal on a specified TTI; or a second indication, indicating not transmitting the reference signal on the specified TTI; or a third indication, indicating transmitting the PUSCH on the specified TTI; or a fourth indication, indicating transmitting the reference signal on a specified symbol.

Alternatively, the first determining module is configured to determine, in response to determining that the indication of the first DCI is the first indication, that the transmission manner of the PUSCH is transmitting the reference signal on the specified TTI.

Alternatively, the first determining module is configured to determine, in response to determining that the indication of the first DCI is the second indication, the transmission manner of the PUSCH according to the first preset condition.

Alternatively, the first determining module is configured to determine the transmission manner of the PUSCH according to the first preset condition in the following manner: in response to determining that the PUSCH was transmitted within a time window previous to the specified TTI, the first determining module determines that the transmission manner of the PUSCH includes: no reference signal is to be transmitted on the specified TTI; and in response to determining that the PUSCH was not transmitted within the time window previous to the specified TTI, the first determining module determines that the transmission manner of the PUSCH includes: the reference signal is to be transmitted on the specified TTI, or neither the reference signal nor data is to be transmitted on the specified TTI.

Alternatively, the first determining module is further configured to determine the transmission manner of the PUSCH according to the first preset condition in the following manner: in response to determining that the reference signal was transmitted within a time window previous to the specified TTI, the first determining module determines that the transmission manner of the PUSCH includes: no reference signal is to be transmitted on the specified TTI; and in response to determining that the reference signal was not transmitted within the time window previous to the specified TTI, the first determining module determines that the transmission manner of the PUSCH includes: the reference signal is to be transmitted on the specified TTI, or neither the reference signal nor data is to be transmitted on the specified TTI.

Alternatively, the first determining module is further configured to determine the transmission manner of the PUSCH according to the first preset condition in the following manner: in response to determining that an uplink grant sent by the base station was received within a time window previous to a TTI where the first DCI is located, the first determining module determines that the transmission manner of the PUSCH includes: no reference signal is to be transmitted on the specified TTI; and in response to determining that no uplink grant sent by the base station was received within the time window previous to the TTI where the first DCI is located, the first determining module determines that the transmission manner of the PUSCH includes: the reference signal is to be transmitted on the specified TTI, or neither the reference signal nor data is to be transmitted on the specified TTI.

Alternatively, the first determining module is configured to determine, in response to determining that the indication of the first DCI is the third indication, that the transmission manner of the PUSCH is determined according to the first preset condition.

Alternatively, the first determining module is configured to determine the transmission manner of the PUSCH according to the first preset condition in the following manner: in response to determining that the PUSCH was not transmitted within a time window previous to the specified TTI, the first determining module determines that the transmission manner of the PUSCH includes: the reference signal is to be transmitted on the specified TTI.

Alternatively, the first determining module is further configured to determine the transmission manner of the PUSCH according to the first preset condition in the following manner:

in response to determining that a PUSCH was transmitted within a time window previous to the specified TTI, in response to determining that an indication bit in the first DCI is flipped with respect to an indication bit in second DCI within the time window previous to the specified TTI, the first determining module determines that the transmission manner of the PUSCH includes: the reference signal is to be transmitted on the specified TTI, where the second DCI corresponds to a PUSCH transmitted within the time window previous to the specified TTI and closest to the specified TTI; and in response to determining that the indication bit in the first DCI is not flipped with respect to the indication bit in the second DCI within the time window previous to the specified TTI, the first determining module determines that the transmission manner of the PUSCH includes: no reference signal is to be transmitted on the specified TTI, or neither the reference signal nor data is to be transmitted on the specified TTI.

Alternatively, the first determining module is further configured to determine the transmission manner of the PUSCH according to the first preset condition in the following manner: in response to determining that a PUSCH was transmitted within a time window previous to the specified TTI, in response to determining that an indication bit in the first DCI is flipped with respect to an indication bit in third DCI within the time window previous to the specified TTI, the first determining module determines that the transmission manner of the PUSCH includes: no reference signal is to be transmitted on the specified TTI, or neither the reference signal nor data is to be transmitted on the specified TTI; where the third DCI corresponds to a PUSCH transmitted within the time window previous to the specified TTI and closest to the specified TTI; or in response to determining that the indication bit in the first DCI is not flipped with respect to the indication bit in the third DCI within the time window previous to the specified TTI, the first determining module determines that the transmission manner of the PUSCH includes: the reference signal is to be transmitted on the specified TTI.

Alternatively, the first determining module is further configured to determine the transmission manner of the PUSCH according to the first preset condition in the following manner: in response to determining that no uplink grant sent by the base station was received within a time window previous to a TTI where the first DCI is located, the first determining module determines that the transmission manner of the PUSCH includes: the reference signal is to be transmitted on the specified TTI.

Alternatively, the first determining module is further configured to determine the transmission manner of the PUSCH according to the first preset condition in the following manner: in response to determining that an uplink grant sent by the base station was received within a time window previous to a TTI where the first DCI is located, in response to determining that an indication bit in the first DCI is flipped with respect to an indication bit in fourth DCI within the time window previous to the TTI where the first DCI is located, the first determining module determines that the transmission manner of the PUSCH includes: no reference signal is to be transmitted on the specified TTI, where the fourth DCI is an uplink grant received within the time window and closest to the TTI where the first DCI is located; and in response to determining that the indication bit in the first DCI is not flipped with respect to the indication bit in the fourth DCI within the time window previous to the TTI where the first DCI is located, the first determining module determines that the transmission manner of the PUSCH includes: no reference signal is to be transmitted on the specified TTI, or neither the reference signal nor data is to be transmitted on the specified TTI.

Alternatively, the first determining module is further configured to determine the transmission manner of the PUSCH according to the first preset condition in the following manner:

in response to determining that an uplink grant sent by the base station was received within a time window previous to a TTI where the first DCI is located, in response to determining that an indication bit in the first DCI is flipped with respect to an indication bit in fifth DCI within the time window previous to the TTI where the first DCI is located, the first determining module determines that the transmission manner of the PUSCH includes: no reference signal is to be transmitted on the specified TTI, or neither the reference signal nor data is to be transmitted on the specified TTI; where the fifth DCI is an uplink grant received within the time window and closest to the TTI where the first DCI is located; or in response to determining that the indication bit in the first DCI is not flipped with respect to the indication bit in the fifth DCI within the time window previous to the TTI where the first DCI is located, the first determining module determines that the transmission manner of the PUSCH includes: no reference signal is to be transmitted on the specified TTI.

Alternatively, the first determining module is further configured to determine the transmission manner of the PUSCH according to the first preset condition in the following manner: in response to determining that the specified TTI includes a candidate demodulation reference signal (DMRS) time domain position, the first determining module determines that the transmission manner of the PUSCH includes: the reference signal is to be transmitted at the candidate DMRS time domain position.

Alternatively, the first determining module is further configured to determine the transmission manner of the PUSCH according to the first preset condition in the following manner: in response to determining that the specified TTI includes no candidate DMRS time domain position, in response to determining that the reference signal was transmitted within a time window previous to the specified TTI, the first determining module determines that the transmission manner of the PUSCH includes: no reference signal is to be transmitted on the specified TTI; and in response to determining that no reference signal was transmitted within the time window previous to the specified TTI, the first determining module determines that the transmission manner of the PUSCH includes: the reference signal is to be transmitted on the specified TTI, or neither the reference signal nor data is to be transmitted on the specified TTI.

Alternatively, the first determining module is further configured to determine the transmission manner of the PUSCH according to the first preset condition in the following manner: in response to determining that the specified TTI includes no candidate DMRS time domain position, the first determining module determines that the transmission manner of the PUSCH includes: no reference signal is to be transmitted on the specified TTI.

Alternatively, the first determining module is configured to determine, in response to determining that the indication of the first DCI is the fourth indication, the transmission manner of the PUSCH according to the first preset condition.

Alternatively, the first determining module is configured to determine the transmission manner of the PUSCH according to the first preset condition in the following manner: in response to determining that the specified symbol is located before a first data transmission symbol, in response to determining that a time interval between the specified symbol and the first data transmission symbol exceeds a first threshold, the first determining module determines that the transmission manner of the PUSCH includes: no reference signal is to be transmitted on the specified symbol and the reference signal is to be transmitted on at least one data transmission symbol; or no reference signal is to be transmitted on the specified symbol and no data is to be transmitted on data transmission symbols.

The first threshold includes one of: N1 TTIs, N2 uplink TTIs, N3 downlink TTIs or N4 symbols, where N1, N2, N3 and N4 are all positive integers.

Alternatively, the first determining module is further configured to determine the transmission manner of the PUSCH according to the first preset condition in the following manner: in response to determining that the specified symbol is located before a first data transmission symbol, and in response to determining a time interval between a TTI where the first DCI is located and the specified symbol is less than a second threshold, the first determining module determines that the transmission manner of the PUSCH includes: no reference signal is to be transmitted on the specified symbol and the reference signal is to be transmitted on at least one data transmission symbol; or no reference signal is to be transmitted on the specified symbol and no reference signal is to be transmitted on data transmission symbols.

The second threshold includes one of: M1 TTIs, M2 uplink TTIs, M3 downlink TTIs or M4 symbols, where M1, M2, M3 and M4 are all positive integers.

In another aspect, an embodiment of the present invention further provides a downlink control information (DCI) indication device. The indication device includes a second determining module and a second transmitting module.

The second determining module is configured to determine content of sixth DCI according to a second preset condition, where the sixth DCI is used for instructing a terminal to transmit a physical uplink shared channel (PUSCH) in a specified transmission manner.

The second transmitting module is configured to transmit the determined sixth DCI to the terminal.

Alternatively, the second determining module is configured to determine the content of the sixth DCI according to the second preset condition in the following manner:

in response to determining that an uplink grant was not transmitted to the terminal within a first time window, the second determining module determines that the content of the sixth DCI includes: instructing the terminal to transmit a reference signal on a specified transmission time interval (TTI); where the uplink grant is used for instructing the terminal to transmit a PUSCH and the first time window is previous to the specified TTI;

in response to determining that at least one uplink grant was transmitted to the terminal within the first time window and all of the at least one uplink grant instructs the terminal not to transmit the reference signal, the second determining module determines that the content of the sixth DCI includes: instructing the terminal to transmit the reference signal on the specified TTI; and in response to determining that the at least one uplink grant was transmitted to the terminal within the first time window and at least one of the at least one uplink grant instructs the terminal to transmit the reference signal, the second determining module determines that the content of the sixth DCI includes: instructing the terminal not to transmit the reference signal on the specified TTI.

Alternatively, the second determining module is configured to determine the content of the sixth DCI according to the second preset condition in the following manner:

in response to determining that an uplink grant was not transmitted to the terminal within a second time window, the second determining module determines that the content of the sixth DCI includes: instructing the terminal to transmit a reference signal on a specified transmission time interval (TTI); where the second time window is previous to a TTI where the sixth DCI is located and the uplink grant is used for instructing the terminal to transmit a PUSCH;

in response to determining that at least one uplink grant was transmitted to the terminal within the second time window and all of the at least one uplink grant instructs the terminal not to transmit the reference signal, the second determining module determines that the content of the sixth DCI includes: instructing the terminal to transmit the reference signal on the specified TTI; and in response to determining that the at least one uplink grant was transmitted to the terminal within the second time window and at least one of the at least one uplink grant instructs the terminal to transmit the reference signal, the second determining module determines that the content of the sixth DCI includes: instructing the terminal not to transmit the reference signal on the specified TTI.

In another aspect, an embodiment of the present invention further provides a terminal. The terminal includes a first processor and a first memory configured to store instructions executable by the first processor. The first processor is configured to perform, according to the instructions sored in the first memory, the operations described below.

The first processor determines a transmission manner of a PUSCH according to at least one of an indication of first downlink control information (DCI) received from a base station and a first preset condition.

The first processor transmits the PUSCH in the determined transmission manner.

Alternatively, the indication of the first DCI includes:

a first indication, indicating transmitting a reference signal on a specified TTI; or a second indication, indicating not transmitting the reference signal on the specified TTI; or a third indication, indicating transmitting the PUSCH on the specified TTI; or a fourth indication, indicating transmitting the reference signal on a specified symbol.

In another aspect, an embodiment of the present invention further provides a base station. The base station includes a second processor and a second memory configured to store instructions executable by the second processor. The second processor is configured to perform, according to the instructions sored in the second memory, the operations described below.

The second processor determines content of sixth DCI according to a second preset condition, where the sixth DCI is used for instructing a terminal to transmit a physical uplink shared channel (PUSCH) in a specified transmission manner.

The second processor sends the determined sixth DCI to the terminal.

The embodiments of the present invention further provide a computer storage medium, which may store executable instructions for executing the PUSCH transmission method in the embodiment described above.

The embodiments of the present invention further provide a computer storage medium, which may store executable instructions for executing the DCI indication method in the embodiment described above.

In the embodiments of the present invention, the terminal determines the transmission manner of the PUSCH according to at least one of the indication of the first downlink control information (DCI) received from the base station and the first preset condition and transmits the PUSCH in the determined transmission manner. Therefore, when the terminal misses the uplink grant of the PUSCH sent by the base station, which causes that the eNB cannot perform demodulation, the terminal can determine the transmission manner of the PUSCH according to the DCI or the preset condition so that the base station can perform the demodulation successfully, avoiding wasting resources.

Other aspects can be understood after the drawings and detailed description are read and understood.

DETAILED DESCRIPTION

Figure 1:
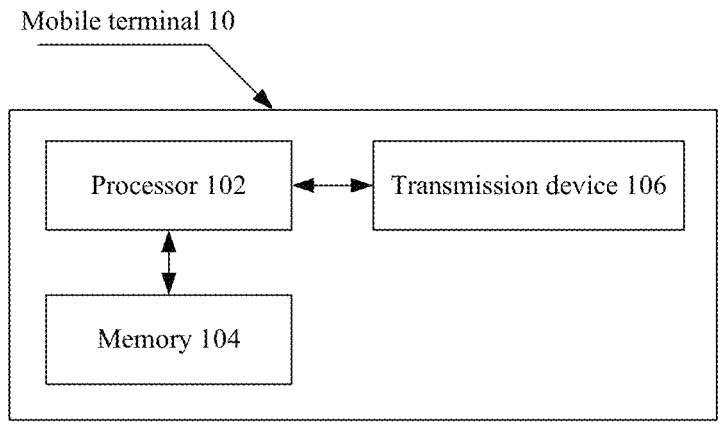
FIG. 1 is a block diagram of hardware configuration of a mobile terminal executing a method for transmitting a PUSCH according to an embodiment of the present invention.

The present invention will be described hereinafter in detail with reference to the drawings in conjunction with the embodiments.

It is to be noted that the terms "first", "second" and the like in the description, claims and drawings of the present invention are used to distinguish between similar objects and are not necessarily used to describe a particular order or sequence. It should be understood that the data used in this way is interchangeable where appropriate so that the embodiments of the present invention described herein may also be implemented in a sequence not illustrated or described herein. In addition, the terms "including", "comprising" or any other variations thereof described herein are intended to encompass a non-exclusive inclusion. For example, a process, method, system, product or apparatus that includes a series of steps or units may include not only the expressly listed steps or units but also other steps or units that are not expressly listed or inherent steps or units of the process, method, system, product or apparatus.

In a short TTI technique, the pilot overheads is relatively large because the TTI is short. One way to reduce the pilot overhead is that multiple TTIs share or multiplex a demodulation reference signal (DMRS). In a case where multiple TTIs share the DMRS, a base station may be unable to send an uplink grant in real time to a terminal for enabling the terminal to transmit the DMRS or not transmit the DMRS, or the base station fails to transmit the uplink grant at the required time, or the base station transmits the uplink grant, but the terminal fails to detect the uplink grant of a certain DMRS. The DMRS is carried on a PUSCH for transmission. The terminal may miss the uplink grant for transmitting a certain PUSCH and determines whether to send the reference signal merely according to the uplink grant for transmitting the PUSCH received subsequently. In this case, since the terminal misses the uplink grant of transmitting the DMRS in a specified TTI, the terminal does not send the DMRS in the next few TTIs, and accordingly an evolved NodeB (eNB) cannot perform demodulation, causing waste of resources.

An embodiment of the present invention provides a method for transmitting a PUSCH. It is to be noted that the steps illustrated in the flowcharts in the drawings may be performed by a computer system such as a group of computer-executable instructions, and although logical sequences are illustrated in the flowcharts, the illustrated or described steps may be performed in sequences different from those described herein in some cases.

Methods provided by the embodiments of the present invention may be executed in a mobile terminal or other similar computing devices. An example in which the method is executed in the mobile terminal is described below. FIG. 1 is a block diagram of hardware configuration of a mobile terminal executing the method for transmitting the PUSCH according to an embodiment of the present invention. As shown in FIG. 1, a mobile terminal 10 may include one or more processors 102 (only one processor is shown in FIG. 1) (the processor 102 may include, but is not limited to, a processing device such as a microcontroller unit (MCU) and a field programmable gate array (FPGA)), a memory 104 configured to store data, and a transmission module 106 configured to implement a communication function. It is to be understood by those skilled in the art that the structure shown in FIG. 1 is merely illustrative and not intended to limit the structure of the mobile terminal. For example, the mobile terminal 10 may include more or fewer components than the components shown in FIG. 1 or may have a configuration different from the configuration shown in FIG. 1.

The memory 104 may be configured to store software programs and modules of application software, such as program instructions/modules corresponding to the PUSCH transmission method in the embodiment of the present invention. The processor 102 is configured to execute the software programs and modules stored in the memory 104 to perform one or more functional applications and data processing, that is, to implement the method for detecting vulnerability of application programs described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processor 102. These remote memories may be connected to the mobile terminal 10 via a network. Examples of the network include the Internet, intranets, local area networks, mobile communication networks and combinations thereof.

The transmission device 106 is configured to receive or transmit data via a network. Specific examples of the network may include a wireless network provided by a communication provider of the mobile terminal 10. In one example, the transmission device 106 includes a network interface controller (NIC), which may be connected to other network devices via the base station and thus be capable of communicating with the Internet. In one example, the transmission device 106 may be a radio frequency (RF) module, which is configured to communicate with the Internet in a wireless way.

Figure 2:
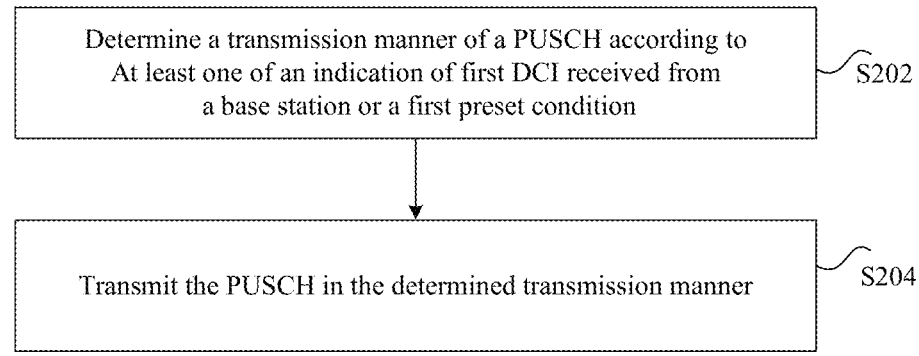
FIG. 2 is a flowchart of a method for transmitting a PUSCH according to an embodiment of the present invention.

FIG. 2 is a flowchart of the method for transmitting a PUSCH according to an embodiment of the present invention. As shown in FIG. 2, the method for transmitting a PUSCH in the embodiment includes the steps described below.

In step S202, a transmission manner of the PUSCH is determined according to at least one of a first preset condition or an indication of first downlink control information (DCI) received from a base station.

In step S204, the PUSCH is transmitted in the determined transmission manner.

In the above steps, a terminal determines the transmission manner of the PUSCH according to at least one of the indication of the first DCI received from the base station or the first preset condition and transmits the PUSCH in the determined transmission manner. Therefore, when the terminal misses the uplink grant of the PUSCH sent by the base station, which causes the eNB unable to demodulate data, the terminal can determine the transmission manner of the PUSCH according to the DCI or the preset condition so that the base station can perform demodulation successfully, avoiding wasting resources.

In an alternative example of the embodiment, the indication of the first DCI includes at least one of:

a first indication, indicating transmitting a reference signal on a specified TTI, where the reference signal is carried on the PUSCH for transmission;

a second indication, indicating not transmitting the reference signal on the specified TTI;

a third indication, indicating transmitting the PUSCH on the specified TTI; or a fourth indication, indicating transmitting the reference signal on a specified symbol.

How the terminal determines the transmission manner with respect to the four different indications of the first DCI is described below in detail.

1. When the indication of the first DCI is the first indication, that is, the first DCI indicates that the reference signal is to be transmitted on the specified TTI, the determined transmission manner of the PUSCH includes transmitting the reference signal on the specified TTI.

2. When the indication of the first DCI is the second indication, that is, the first DCI indicates that the reference signal is not to be transmitted on the specified TTI, the transmission manner of the PUSCH is determined according to the first preset condition.

Alternatively, the process of determining the transmission manner of the PUSCH according to the first preset condition is as follows.

If a PUSCH was transmitted within a time window previous to the specified TTI, the determined transmission manner of the PUSCH includes: not transmitting the reference signal on the specified TTI. If no PUSCH was transmitted within the time window previous to the specified TTI, the determined transmission manner of the PUSCH includes: transmitting the reference signal on the specified TTI, or not transmitting the reference signal or data on the specified TTI.

Alternatively, the process of determining the transmission manner of the PUSCH according to the first preset condition further includes the following steps.

If the reference signal was transmitted within the time window previous to the specified TTI, the determined transmission manner of the PUSCH includes: not transmitting the reference signal on the specified TTI. If the reference signal was not transmitted within the time window previous to the specified TTI, the determined transmission manner of the PUSCH includes: transmitting the reference signal on the specified TTI, or not transmitting the reference signal or data on the specified TTI.

The process of determining the transmission manner of the PUSCH according to the first preset condition further includes the following steps.

If an uplink grant sent by the base station was received within a time window previous to a TTI where the first DCI is located, the determined transmission manner of the PUSCH includes: not transmitting the reference signal on the specified TTI. If no uplink grant sent by the base station was received within the time window previous to the TTI where the first DCI is located, the determined transmission manner of the PUSCH includes: transmitting the reference signal on the specified TTI, or not transmitting the reference signal or data on the specified TTI.

3. When the indication of the first DCI is the third indication, that is, the first DCI indicates that the PUSCH is to be transmitted on the specified TTI, the transmission manner of the PUSCH is determined according to the first preset condition.

Alternatively, the process of determining the transmission manner of the PUSCH is determined according to the first preset condition is as follows.

If no PUSCH was not transmitted within the time window previous to the specified TTI, the determined transmission manner of the PUSCH includes: transmitting the reference signal on the specified TTI.

Alternatively, the process of determining the transmission manner of the PUSCH according to the first preset condition further includes the following steps.

If a PUSCH was transmitted within the time window previous to the specified TTI, the operation described below is performed.

If an indication bit in the first DCI is flipped with respect to an indication bit in second DCI within the time window previous to the specified TTI, the determined transmission manner of the PUSCH includes: transmitting the reference signal on the specified TTI. The second DCI corresponds to a PUSCH transmitted within the time window previous to the specified TTI and transmitted closest to the specified TTI.

If the indication bit in the first DCI is not flipped with respect to the indication bit in the second DCI, the determined transmission manner of the PUSCH includes: not transmitting the reference signal on the specified TTI, or not transmitting the reference signal or data on the specified TTI.

Alternatively, the process of determining the transmission manner of the PUSCH according to the first preset condition further includes the followings.

If the PUSCH was transmitted within the time window previous to the specified TTI, the operation described below is performed.

If the indication bit in the first DCI is flipped with respect to an indication bit in third DCI within the time window previous to the specified TTI, the determined transmission manner of the PUSCH includes: not transmitting the reference signal on the specified TTI, or not transmitting the reference signal or data on the specified TTI. The third DCI corresponds to a PUSCH transmitted within the time window previous to the specified TTI and closest to the specified TTI.

If the indication bit in the first DCI is not flipped with respect to the indication bit in the third DCI, the determined transmission manner of the PUSCH includes: transmitting the reference signal on the specified TTI.

Alternatively, the process of determining the transmission manner of the PUSCH according to the first preset condition further includes the followings.

If no uplink grant sent by the base station was received within the time window previous to the TTI where the first DCI is located, the determined transmission manner of the PUSCH includes: transmitting the reference signal on the specified TTI.

Alternatively, the process of determining the transmission manner of the PUSCH according to the first preset condition further includes the followings.

If an uplink grant sent by the base station was received within the time window previous to the TTI where the first DCI is located, the operation described below is performed.

If the indication bit in the first DCI is flipped with respect to an indication bit in fourth DCI within the time window previous to the TTI where the first DCI is located, the determined transmission manner of the PUSCH includes: not transmitting the reference signal on the specified TTI. The fourth DCI is an uplink grant received within the time window and closest to the TTI where the first DCI is located.

If the indication bit in the first DCI is not flipped with respect to the indication bit in the fourth DCI, the determined transmission manner of the PUSCH includes: not transmitting the reference signal on the specified TTI, or not transmitting the reference signal or data on the specified TTI.

Alternatively, the process of determining the transmission manner of the PUSCH according to the first preset condition further includes the followings.

If the uplink grant sent by the base station was received within the time window previous to the TTI where the first DCI is located, the operation described below is performed.

If the indication bit in the first DCI is flipped with respect to an indication bit in fifth DCI within the time window previous to the TTI where the first DCI is located, the determined transmission manner of the PUSCH includes: not transmitting the reference signal on the specified TTI, or not transmitting the reference signal or data on the specified TTI. The fifth DCI is the uplink grant received within the time window and closest to the TTI where the first DCI is located.

If the indication bit in the first DCI is not flipped with respect to the indication bit in the fifth DCI, the determined transmission manner of the PUSCH includes: not transmitting the reference signal on the specified TTI.

4. When the indication of the first DCI is the fourth indication, that is, the first DCI indicates that the reference signal is to be transmitted on the specified symbol, the transmission manner of the PUSCH is determined according to the first preset condition.

Alternatively, the process of determining the transmission manner of the PUSCH according to the first preset condition is as follows.

If the specified symbol is located before a first one of data transmission symbols, the operation described below is performed.

If a time interval between the specified symbol and the first one of the data transmission symbols exceeds a first threshold, the determined transmission manner of the PUSCH includes: not transmitting the reference signal on the specified symbol while transmitting the reference signal on at least one of the data transmission symbols; or not transmitting the reference signal on the specified symbol and not transmitting data on the data transmission symbols.

The first threshold includes one of: N1 TTIs, N2 uplink TTIs, N3 downlink TTIs and N4 symbols, where N1, N2, N3 and N4 are all positive integers.

Alternatively, the process of determining the transmission manner of the PUSCH according to the first preset condition further includes the followings.

If the specified symbol is located before the first one of the data transmission symbols, the operation described below is performed.

When a time interval between the TTI where the first DCI is located and the specified symbol is less than a second threshold, the determined transmission manner of the PUSCH includes: not transmitting the reference signal on the specified symbol while transmitting the reference signal on the at least one data transmission symbol; or not transmitting the reference signal on the specified symbol and not transmitting the reference signal on the data transmission symbols.

The second threshold includes one of: M1 TTIs, M2 uplink TTIs, M3 downlink TTIs and M4 symbols, where M1, M2, M3 and M4 are all positive integers.

Alternatively, the process of determining the transmission manner of the PUSCH according to the first preset condition further includes the followings.

If the specified TTI includes a candidate DMRS time domain position, the determined transmission manner of the PUSCH includes: transmitting the reference signal at the candidate DMRS time domain position.

Alternatively, the process of determining the transmission manner of the PUSCH according to the first preset condition further includes the followings.

If the specified TTI includes no candidate DMRS time domain position, the operation described below is performed.

If the reference signal was transmitted within the time window previous to the specified TTI, the determined transmission manner of the PUSCH includes: not transmitting the reference signal on the specified TTI. If the reference signal was not transmitted within the time window previous to the specified TTI, the determined transmission manner of the PUSCH includes: transmitting the reference signal on the specified TTI, or not transmitting the reference signal or data on the specified TTI.

Alternatively, the process of determining the transmission manner of the PUSCH according to the first preset condition further includes the followings.

If the specified TTI includes no DMRS candidate time domain position, the determined transmission manner of the PUSCH includes: not transmitting the reference signal on the specified TTI.

The time window involved in the embodiment of the present invention includes at least one of K1 TTIs, K2 uplink TTIs, K3 downlink TTIs or K4 symbols, where K1, K2, K3 and K4 are all positive integers.

Figure 3:
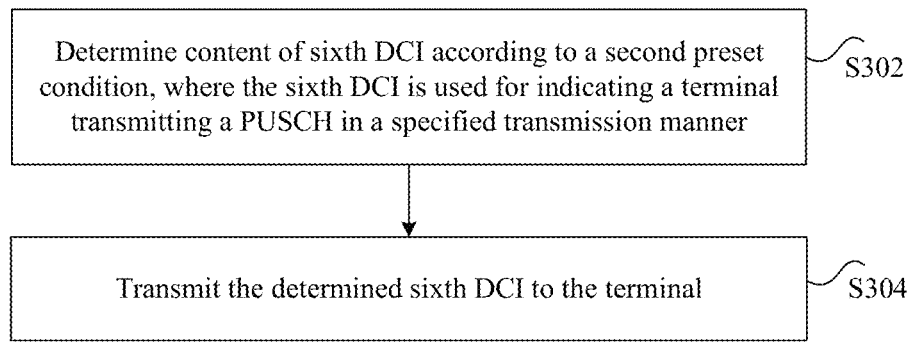
FIG. 3 is a flowchart of a DCI indication method according to an embodiment of the present invention.

A downlink control information (DCI) indication method on the base station side is further provided in the embodiment. FIG. 3 is a flowchart of a DCI indication method according to an embodiment of the present invention. As shown in FIG. 3, the method includes the steps described below.

In step S302, content of sixth DCI is determined according to a second preset condition. The sixth DCI is used for indicating a terminal transmitting a physical uplink shared channel (PUSCH) in a specified transmission manner.

In step S304, the determined sixth DCI is transmitted to the terminal.

In the above step, the base station determines the content of the sixth DCI according to the second preset condition. The sixth DCI is used for instructing the terminal to transmit the PUSCH in the specified transmission manner.

The base station transmits the determined sixth DCI to the terminal. Therefore, if the terminal misses an uplink grant of the PUSCH sent by the base station, causing the eNB cannot perform demodulation, the terminal may determine the transmission manner of the PUSCH according to the DCI or the preset condition, so that the base station can perform the demodulation successfully, avoiding wasting resources.

In an alternative example of the embodiment, the above step S302 may be implemented in the manner described below.

If no uplink grant was transmitted to the terminal within a first time window, the determined content of the sixth DCI includes: indicating the terminal transmitting a reference signal on a specified TTI. The uplink grant is used for instructing the terminal to transmit a PUSCH within the first time window and the first time window is previous to the specified TTI.

If at least one uplink grant was transmitted to the terminal and none of the at least one uplink grant instructs the terminal to transmit the reference signal, the determined content of the sixth DCI indicates that the terminal is to transmit the reference signal on the specified TTI.

If the at least one uplink grant was transmitted to the terminal and at least one of the at least one uplink grant instructs the terminal to transmit the reference signal, the determined content of the sixth DCI includes: indicating the terminal not transmitting the reference signal on the specified TTI.

Alternatively, the above step S302 may be further implemented in the manner described below.

If no uplink grant was not transmitted to the terminal within a second time window, the determined content of the sixth DCI includes: indicating the terminal transmitting the reference signal on the specified TTI. The second time window is previous to a TTI where the sixth DCI is located and the uplink grant is used for instructing the terminal to transmit a PUSCH within the second time window.

If at least one uplink grant was transmitted to the terminal within the second time window and all of the at least one uplink grant instructs the terminal not to transmit the reference signal, the determined content of the sixth DCI includes: indicating the terminal transmitting the reference signal on the specified TTI.

If the at least one uplink grant was transmitted to the terminal within the second time window and at least one of the at least one uplink grant instructs the terminal to transmit the reference signal, the determined content of the sixth DCI includes: indicating the terminal not transmitting the reference signal on the specified TTI.

It is to be noted that the terminal may receive multiple uplink grants or DCI indications within one time window. The first time window may include multiple uplink grants and the second time window may also include multiple uplink grants, which is not limited in the embodiment.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the solution provided by the present invention substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal apparatus (which may be a mobile phone, a computer, a server or a network apparatus) to execute the methods according to one or more embodiments of the present disclosure.

The embodiment provides a device for transmitting a PUSCH, and the device is applied to a terminal. The device is used for implementing the above embodiments and optional examples of the PUSCH transmission method. What has been described will not be repeated. As used below, the term "module" may be software, hardware or a combination thereof capable of implementing predetermined functions. The device described below in the embodiment is implemented by software, but implementation by hardware or by a combination of software and hardware is also possible and conceived.

Figure 4:
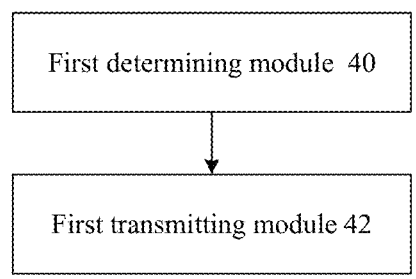
FIG. 4 is a block diagram of a device transmitting a PUSCH according to an embodiment of the present invention.

FIG. 4 is a block diagram of a device for transmitting a PUSCH according to an embodiment of the present invention. As shown in FIG. 4, the device includes: a first determining module 40 and a first transmitting module 42.

The first determining module 40 is configured to determine a transmission manner of a PUSCH according to at least one of an indication of first downlink control information (DCI) received from a base station or a first preset condition.

The first transmitting module 42 is configured to transmit the PUSCH in the determined transmission manner.

In the above device, the first determining module 40 determines the transmission manner of the PUSCH according to at least one of the indication of first downlink control information (DCI) received from the base station or the first preset condition; and the first transmitting module 42 is configured to transmit the PUSCH in the determined transmission manner.

Therefore, when the terminal misses the uplink grant of the PUSCH sent by the base station causing the eNB unable to perform demodulation, the terminal can determine the transmission manner of the PUSCH according to the DCI or the preset condition so that the base station may perform the demodulation successfully, avoiding wasting resources.

In an alternative example of the embodiment, the indication of the first DCI includes at least one of:

a first indication, indicating that a reference signal is to be transmitted on a specified TTI;

a second indication, indicating that the reference signal is not to be transmitted on the specified TTI;

a third indication, indicating that the PUSCH is to be transmitted on the specified TTI; or a fourth indication, indicating that the reference signal is to be transmitted on a specified symbol.

1. When the indication of the first DCI is the first indication, the first determining module 40 is configured to determine that the transmission manner of the PUSCH is transmitting the reference signal on the specified TTI.

2. When the indication of the first DCI is the second indication, the first determining module 40 is configured to determine the transmission manner of the PUSCH according to the first preset condition.

Alternatively, if a PUSCH was transmitted within a time window previous to the specified TTI, the first determining module 40 is further configured to determine that the transmission manner of the PUSCH includes not transmitting reference signal on the specified TTI. If no PUSCH was transmitted, the first determining module 40 is further configured to determine that the transmission manner of the PUSCH includes transmitting the reference signal on the specified TTI, or transmitting no reference signal and no data on the specified TTI.

Alternatively, if the reference signal was transmitted within the time window previous to the specified TTI, the first determining module 40 is configured to determine that the transmission manner of the PUSCH includes not transmitting the reference signal on the specified TTI. If the reference signal was not transmitted, the first determining module 40 is configured to determine that the transmission manner of the PUSCH includes transmitting the reference signal on the specified TTI, or transmitting no reference signal and no data on the specified TTI.

Alternatively, if an uplink grant sent by the base station was received within a time window previous to a TTI where the first DCI is located, the first determining module 40 is further configured to determine that the transmission manner of the PUSCH includes transmitting no reference signal on the specified TTI. If the uplink grant sent by the base station was not received, the first determining module 40 is further configured to determine that the transmission manner of the PUSCH includes transmitting the reference signal on the specified TTI, or transmitting no reference signal and no data on the specified TTI.

3. When the indication of the received first DCI is the third indication, the first determining module 40 is configured to determine the transmission manner of the PUSCH according to the first preset condition.

Alternatively, if no PUSCH was not transmitted within the time window previous to the specified TTI, the first determining module 40 is configured to determine that the transmission manner of the PUSCH includes transmitting the reference signal on the specified TTI.

Alternatively, if the PUSCH was transmitted within the time window previous to the specified TTI, the first determining module 40 is further configured to perform the operation described below.

If an indication bit in the first DCI is flipped with respect to an indication bit in second DCI within the time window previous to the specified TTI, the first determining module determines that the transmission manner of the PUSCH includes transmitting the reference signal on the specified TTI. The second DCI corresponds to a PUSCH, transmitted closest to the specified TTI, within the time window previous to the specified TTI.

If the indication bit in the first DCI is not flipped with respect to the indication bit in the second DCI, the first determining module determines that the transmission manner of the PUSCH includes not transmitting the reference signal on the specified TTI, or not transmitting the reference signal or data on the specified TTI.

Alternatively, if a PUSCH was transmitted within the time window previous to the specified TTI, the first determining module 40 is further configured to perform the operation described below.

If the indication bit in the first DCI is flipped with respect to an indication bit in third DCI within the time window previous to the specified TTI, the first determining module determines that the transmission manner of the PUSCH includes: not transmitting the reference signal on the specified TTI, or not transmitting the reference signal or data on the specified TTI. The third DCI corresponds to a PUSCH transmitted closest to the specified TTI within the time window previous to the specified TTI.

If the indication bit in the first DCI is not flipped with respect to the indication bit in the third DCI, the first determining module determines that the transmission manner of the PUSCH includes transmitting the reference signal on the specified TTI.

Alternatively, if the uplink grant sent by the base station was not received within the time window previous to the TTI where the first DCI is located, the first determining module 40 is further configured to determine that the transmission manner of the PUSCH including transmitting the reference signal on the specified TTI.

Alternatively, if the uplink grant sent by the base station was received within the time window previous to the TTI where the first DCI is located, the first determining module 40 is further configured to perform the operation described below.

If the indication bit in the first DCI is flipped with respect to an indication bit in fourth DCI within the time window previous to the TTI where the first DCI is located, the first determining module determines that the transmission manner of the PUSCH includes not transmitting the reference signal on the specified TTI. The fourth DCI is an uplink grant received within the time window and closest to the TTI where the first DCI is located.

If the indication bit in the first DCI is not flipped with respect to the indication bit in the fourth DCI, the first determining module determines that the transmission manner of the PUSCH includes the reference signal is not to be transmitted on the specified TTI, or neither the reference signal nor data is to be transmitted on the specified TTI.

Alternatively, if the uplink grant sent by the base station was received within the time window previous to the TTI where the first DCI is located, the first determining module 40 is further configured to perform the operation described below.

If the indication bit in the first DCI is flipped with respect to an indication bit in fifth DCI within the time window previous to the TTI where the first DCI is located, the first determining module determines that the transmission manner of the PUSCH includes not transmitting the reference signal on the specified TTI, or not transmitting the reference signal or data on the specified TTI. The fifth DCI is the uplink grant received within the time window and closest to the TTI where the first DCI is located.

If the indication bit in the first DCI is not flipped with respect to the indication bit in the fifth DCI, the first determining module determines that the transmission manner of the PUSCH includes not transmitting the reference signal on the specified TTI.

4. When the indication of the first DCI is the fourth indication, the first determining module 40 is configured to determine the transmission manner of the PUSCH according to the first preset condition.

Alternatively, if the specified symbol is located before a first one of data transmission symbols, the first determining module 40 is configured to perform the operation described below.

If a time interval between the specified symbol and the first data transmission symbol exceeds a first threshold, the first determining module determines that the transmission manner of the PUSCH includes not transmitting the reference signal on the specified symbol while transmitting the reference signal on at least one of the data transmission symbols; or not transmitting the reference signal on the specified symbol and not transmitting data on the data transmission symbols.

The first threshold includes one of: N1 TTIs, N2 uplink TTIs, N3 downlink TTIs or N4 symbols, where N1, N2, N3 and N4 are all positive integers.

Alternatively, if the specified symbol is located before the first one of the data transmission symbols, the first determining module 40 is further configured to perform the operation described below.

If a time interval between the TTI where the first DCI is located and the specified symbol is less than a second threshold, the first determining module determines that the transmission manner of the PUSCH includes not transmitting the reference signal on the specified symbol and transmitting the reference signal on the at least one data transmission symbol; or not transmitting the reference signal on the specified symbol and not transmitting the reference signal on the data transmission symbols.

The second threshold includes one of: M1 TTIs, M2 uplink TTIs, M3 downlink TTIs or M4 symbols, where M1, M2, M3 and M4 are all positive integers.

Alternatively, if the specified TTI includes a candidate DMRS time domain position, the first determining module 40 is further configured to determine that the transmission manner of the PUSCH includes transmitting the reference signal at the candidate DMRS time domain position.

Alternatively, if the specified TTI includes no candidate DMRS time domain position, the first determining module 40 is further configured to perform the operation described below.

If the reference signal was transmitted within the time window previous to the specified TTI, the first determining module determines that the transmission manner of the PUSCH includes not transmitting the reference signal on the specified TTI. If the reference signal was not transmitted, the first determining module determines that the transmission manner of the PUSCH includes transmitting the reference signal on the specified TTI, or not transmitting the reference signal or data on the specified TTI.

Alternatively, if the specified TTI includes no candidate DMRS time domain position, the first determining module determines that the transmission manner of the PUSCH includes not transmitting the reference signal on the specified TTI.

For a better understanding of the embodiments of the present invention, the embodiment further provides a DCI indication device applied to a base station. The device is used for implementing the above embodiments and alternative examples of the DCI indication method. What has been described will not be repeated. As used below, the term "module" may be software, hardware or a combination thereof capable of implementing predetermined functions. The device described below in the embodiment is implemented by software, but implementation by hardware or by a combination of software and hardware is also possible and conceived.

Figure 5:
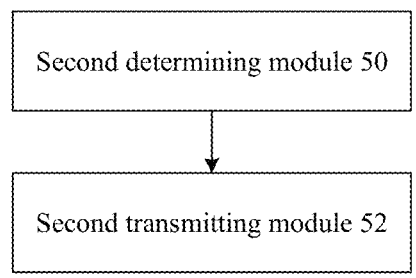
FIG. 5 is a block diagram of a DCI indication device according to an embodiment of the present invention.

FIG. 5 is a block diagram of a DCI indication device according to an embodiment of the present invention. As shown in FIG. 5, the device includes: a second determining module 50 and a second transmitting module 52.

The second determining module 50 is configured to determine content of sixth DCI according to a second preset condition. The sixth DCI is used for instructing the terminal to transmit a physical uplink shared channel (PUSCH) in a specified transmission manner.

The second transmitting module 52 is configured to transmit the determined sixth DCI to the terminal.

In the above device, the second determining module 50 determines the content of the sixth DCI according to the second preset condition. The sixth DCI is used for indicating the terminal transmitting the physical uplink shared channel (PUSCH) in the specified transmission manner. The second transmitting module 52 transmits the determined sixth DCI to the terminal. Therefore, when the terminal misses an uplink grant of the PUSCH sent by the base station causing the eNB unable to perform demodulation, the terminal can determine the transmission manner of the PUSCH according to the DCI or the preset condition so that the base station may perform the demodulation successfully, avoiding wasting resources.

In an optional example of the embodiment, the second determining module 50 is configured to perform the operation described below.

If no uplink grant was transmitted to the terminal within a first time window, the second determining module determines that the content of the sixth DCI includes instructing the terminal to transmit a reference signal on a specified TTI. The uplink grant is used for instructing the terminal to transmit a PUSCH within the first time window and the first time window is previous to the specified TTI.

If at least one uplink grant was transmitted to the terminal and none of the at least one uplink grant instructs the terminal to transmit the reference signal, the second determining module determines that the content of the sixth DCI includes instructing the terminal to transmit the reference signal on the specified TTI.

If the at least one uplink grant was transmitted to the terminal and at least one of the at least one uplink grant instructs the terminal to transmit the reference signal, the second determining module determines that the content of the sixth DCI includes instructing the terminal not to transmit the reference signal on the specified TTI.

In an alternative example of the embodiment, the second determining module 50 is configured to perform the operation described below.

If the uplink grant was not transmitted to the terminal within a second time window, the second determining module determines that the content of the sixth DCI includes instructing the terminal to transmit the reference signal on the specified TTI. The second time window is previous to a TTI where the sixth DCI is located and the uplink grant is used for instructing the terminal to transmit a PUSCH within the second time window.

If at least one uplink grant was transmitted to the terminal within the second time window and none of the at least one uplink grant instructs the terminal to transmit the reference signal, the second determining module determines that the content of the sixth DCI includes instructing the terminal to transmit the reference signal on the specified TTI.

If at least one uplink grant was transmitted to the terminal within the second time window and at least one of the at least one uplink grant instructs the terminal to transmit the reference signal, the second determining module determines that the content of the sixth DCI includes instructing the terminal not to transmit the reference signal on the specified TTI.

It is to be noted that multiple uplink grants or DCI indications may be received within one time window. Therefore, the first time window may include multiple uplink grants and the second time window may also include multiple uplink grants, which is not limited in the embodiment.

Figure 6:
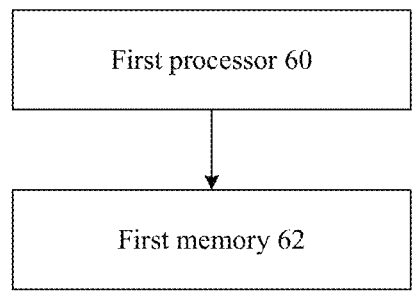
FIG. 6 is a block diagram of a terminal according to an embodiment of the present invention.

For a better understanding of the embodiments of the present invention, the embodiment further provides a terminal as a body for implementing the above PUSCH transmission device. What has been described will not be repeated. FIG. 6 is a block diagram of a terminal according to an embodiment of the present invention. As shown in FIG. 6, the terminal includes a first processor 60 and a first memory 62.

The first memory 62 is configured to store instructions executable by the first processor 60.

The first processor 60 is configured to perform, according to the instructions sored in the first memory 62, the operations described below.

A transmission manner of a PUSCH is determined according to at least one of an indication of first downlink control information (DCI) received from a base station or a first preset condition.

The PUSCH is transmitted in the determined transmission manner.

In the above terminal, the first processor 60 is configured to determine the transmission manner of the PUSCH according to at least one of the indication of the first DCI received from the base station or the first preset condition, and transmit the PUSCH in the determined transmission manner. Therefore, when the terminal misses an uplink grant of the PUSCH sent by the base station, which may cause the eNB unable to perform demodulation, the terminal can determine the transmission manner of the PUSCH according to DCI or a preset condition so that the base station may perform the demodulation successfully, avoiding wasting resources.

Alternatively, the indication of the first DCI includes at least one of:

a first indication, indicating that a reference signal is to be transmitted on a specified TTI;

a second indication, indicating that no reference signal is to be transmitted on the specified TTI;

a third indication, indicating that the PUSCH is to be transmitted on the specified TTI; or a fourth indication, indicating that the reference signal is to be transmitted on a specified symbol.

1. When the indication of the first DCI is the first indication, the first processor 60 is configured to determine that the transmission manner of the PUSCH includes transmitting the reference signal on the specified TTI.

2. When the indication of the first DCI is the second indication, the first processor 60 is configured to determine the transmission manner of the PUSCH according to the first preset condition.

Alternatively, if a PUSCH was transmitted within a time window previous to the specified TTI, the first processor 60 is further configured to determine that the transmission manner of the PUSCH includes not transmitting the reference signal on the specified TTI. If no PUSCH was transmitted, the first processor 60 is further configured to determine that the transmission manner of the PUSCH includes transmitting the reference signal on the specified TTI, or not transmitting the reference signal or data on the specified TTI.

Alternatively, if the reference signal was transmitted within a time window previous to the specified TTI, the first processor 60 is further configured to determine that the transmission manner of the PUSCH includes not transmitting the reference signal on the specified TTI. If the reference signal was not transmitted, the first processor 60 is further configured to determine that the transmission manner of the PUSCH includes transmitting the reference signal on the specified TTI, or not transmitting the reference signal or data on the specified TTI.

Alternatively, if an uplink grant sent by the base station was received within the time window previous to the specified TTI, the first processor 60 is further configured to determine that the transmission manner of the PUSCH includes not transmitting the reference signal on the specified TTI. If the uplink grant sent by the base station was not received, the first processor 60 is further configured to determine that the transmission manner of the PUSCH includes transmitting the reference signal on the specified TTI, or not transmitting the reference signal or data on the specified TTI.

3. When the indication of the received first DCI is the third indication, the first processor 60 is configured to determine the transmission manner of the PUSCH according to the first preset condition.

Alternatively, if the PUSCH was not transmitted within the time window previous to the specified TTI, the first processor 60 is further configured to determine that the transmission manner of the PUSCH includes transmitting the reference signal on the specified TTI.

Alternatively, if the PUSCH was transmitted within the time window previous to the specified TTI, the first processor 60 is further configured to perform the operation described below.

If an indication bit in the first DCI is flipped with respect to an indication bit in second DCI within the time window previous to the specified TTI, it is determined that the transmission manner of the PUSCH includes transmitting the reference signal on the specified TTI. The second DCI corresponds to a PUSCH transmitted within the time window previous to the specified TTI and closest to the specified TTI.

If the indication bit in the first DCI is not flipped with respect to the indication bit in the second DCI, it is determined that the transmission manner of the PUSCH includes not transmitting the reference signal on the specified TTI, or not transmitting the reference signal or data on the specified TTI.

Alternatively, if the PUSCH was transmitted within the time window previous to the specified TTI, the first processor 60 is further configured to perform the operation described below.

If the indication bit in the first DCI is flipped with respect to an indication bit in third DCI within the time window previous to the specified TTI, it is determined that the transmission manner of the PUSCH includes not transmitting the reference signal on the specified TTI, or not transmitting the reference signal or data on the specified TTI. The third DCI corresponds to a PUSCH transmitted closest to the specified TTI among PUSCHs transmitted within the time window previous to the specified TTI.

If the indication bit in the first DCI is not flipped with respect to the indication bit in the third DCI, it is determined that the transmission manner of the PUSCH includes the reference signal is to be transmitted on the specified TTI.

Alternatively, if the uplink grant sent by the base station was not received within the time window previous to the TTI where the first DCI is located, the first processor 60 is further configured to determine that the transmission manner of the PUSCH includes the reference signal is to be transmitted on the specified TTI.

Alternatively, if the uplink grant sent by the base station was received within the time window previous to the TTI where the first DCI is located, the first processor 60 is further configured to perform the operation described below.

If the indication bit in the first DCI is flipped with respect to an indication bit in fourth DCI within the time window previous to the TTI where the first DCI is located, it is determined that the transmission manner of the PUSCH includes not transmitting the reference signal on the specified TTI. The fourth DCI is an uplink grant received closest to the TTI where the first DCI is located among uplink grants received within the time window.

If the indication bit in the first DCI is not flipped with respect to the indication bit in the fourth DCI, it is determined that the transmission manner of the PUSCH includes not transmitting the reference signal on the specified TTI, or not transmitting the reference signal or data on the specified TTI.

Alternatively, if the uplink grant sent by the base station was received within the time window previous to the TTI where the first DCI is located, the first processor 60 is further configured to perform the operation described below.

If the indication bit in the first DCI is flipped with respect to an indication bit in fifth DCI within the time window previous to the TTI where the first DCI is located, it is determined that the transmission manner of the PUSCH includes not transmitting the reference signal on the specified TTI, or not transmitting the reference signal or data on the specified TTI. The fifth DCI is the uplink grant received closest to the TTI where the first DCI is located among uplink grants received within the time window.

If the indication bit in the first DCI is not flipped with respect to the indication bit in the fifth DCI, it is determined that the transmission manner of the PUSCH includes not transmitting the reference signal on the specified TTI.

4. When the indication of the first DCI is the fourth indication, the first processor 60 is further configured to determine the transmission manner of the PUSCH according to the first preset condition.

Alternatively, when the specified symbol is located before a first one of data transmission symbols, the first processor 60 is further configured to perform the operation described below.

When a time interval between the specified symbol and the one of first data transmission symbols exceeds a first threshold, it is determined that the transmission manner of the PUSCH includes not transmitting the reference signal on the specified symbol and transmitting the reference signal on at least one of the data transmission symbols; or not transmitting the reference signal on the specified symbol and not transmitting data on the data transmission symbols.

The first threshold includes one of: N1 TTIs, N2 uplink TTIs, N3 downlink TTIs or N4 symbols, where N1, N2, N3 and N4 are all positive integers.

Alternatively, when the specified symbol is located before the first one of the data transmission symbols, the first processor 60 is further configured to perform the operation described below.

When a time interval between the TTI where the first DCI is located and the specified symbol is less than a second threshold, it is determined that the transmission manner of the PUSCH includes not transmitting the reference signal on the specified symbol and transmitting the reference signal on the at least one of the data transmission symbols; or not transmitting the reference signal on the specified symbol and not transmitting the reference signal on the data transmission symbols.

The second threshold includes one of: M1 TTIs, M2 uplink TTIs, M3 downlink TTIs or M4 symbols, where M1, M2, M3 and M4 are all positive integers.

Alternatively, if the specified TTI includes a candidate DMRS time domain position, the first processor 60 is further configured to determine that the transmission manner of the PUSCH includes transmitting the reference signal at the candidate DMRS time domain position.

Alternatively, if the specified TTI includes no candidate DMRS time domain position, the first processor 60 is further configured to perform the operation described below.

If the reference signal was transmitted within the time window previous to the specified TTI, the first processor determines that the transmission manner of the PUSCH includes not transmitting the reference signal on the specified TTI. If the reference signal was not transmitted, the first processor determines that the transmission manner of the PUSCH including transmitting the reference signal on the specified TTI, or not transmitting the reference signal or data on the specified TTI.

Alternatively, if the specified TTI includes no candidate DMRS time domain position, it is determined that the transmission manner of the PUSCH includes not transmitting the reference signal on the specified TTI.

Figure 7:
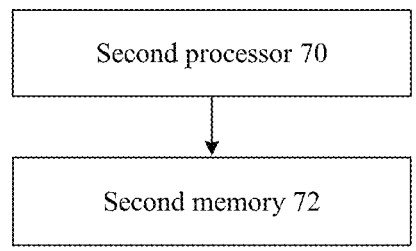
FIG. 7 is a block diagram of a base station according to an embodiment of the present invention.

For a better understanding of the embodiments of the present invention, the embodiment further provides a base station as a body for implementing the above DCI indication device. What has been described will not be repeated. FIG. 7 is a block diagram of a base station according to an embodiment of the present invention. As shown in FIG. 7, the base station includes a second processor 70 and a second memory 72.

The second memory 72 is configured to store instructions executable by the second processor 70.

The second processor 70 is configured to perform, according to the instructions sored in the second memory 72, the operations described below.

A content of sixth DCI is determined according to a second preset condition. The sixth DCI is used for instructing a terminal to transmit a physical uplink shared channel (PUSCH) in a specified transmission manner.

The determined sixth DCI is transmitted to the terminal.

In the above base station, the second processor 70 determines the content of the sixth DCI according to the second preset condition. The sixth DCI is used for instructing the terminal to transmit the physical uplink shared channel (PUSCH) in the specified transmission manner. The second processor 70 transmits the determined sixth DCI to the terminal. Therefore, when the terminal misses an uplink grant of the PUSCH sent by the base station which may cause the eNB unable to perform demodulation, the terminal can determine the transmission manner of the PUSCH according to DCI or a preset condition so that the base station may perform the demodulation successfully, avoiding wasting resources.

In an alternative example of the embodiment, the second processor 70 is further configured to perform the operation described below.

If an uplink grant was not transmitted to the terminal within a first time window, it is determined that the content of the sixth DCI includes instructing the terminal to transmit a reference signal on a specified TTI. The uplink grant is used for instructing the terminal to transmit a PUSCH within the first time window and the first time window is previous to the specified TTI.

If at least one uplink grant was transmitted to the terminal and none of the at least one uplink grant instructs the terminal to transmit the reference signal, it is determined that the content of the sixth DCI includes instructing the terminal to transmit the reference signal on the specified TTI.

If the at least one uplink grant was transmitted to the terminal and at least one of the at least one uplink grant instructs the terminal to transmit the reference signal, it is determined that the content of the sixth DCI includes instructing the terminal not to transmit the reference signal on the specified TTI.

In an alternative example of the embodiment, the second processor 70 is further configured to perform the operation described below.

If the uplink grant was not transmitted to the terminal within a second time window, it is determined that the content of the sixth DCI includes instructing the terminal to transmit the reference signal on the specified TTI. The second time window is previous to a TTI where the sixth DCI is located and the uplink grant is used for instructing the terminal to transmit a PUSCH within the second time window.

If at least one uplink grant was transmitted to the terminal within the second time window and none of the at least one uplink grant instructs the terminal to transmit the reference signal, it is determined that the content of the sixth DCI includes instructing the terminal to transmit the reference signal on the specified TTI.

If the at least one uplink grant was transmitted to the terminal within the second time window and at least one of the at least one uplink grant instructs the terminal to transmit the reference signal, it is determined that the content of the sixth DCI includes instructing the terminal not to transmit the reference signal on the specified TTI.

It is to be noted that multiple uplink grants or DCI indications may be received within one time window. Therefore, the first time window may include multiple uplink grants and the second time window may also include multiple uplink grants, which is not limited in the embodiment.

The embodiment provides a method for transmitting a DMRS to avoid the following problem. If the terminal fails to detect an uplink grant indicating transmitting the DMRS, the terminal will not transmit the DMRS in next few TTIs, causing that the eNB cannot perform demodulation and resources are wasted.

The embodiment is described with taking a short TTI system as an example. It is to be noted that the method in the embodiment is not limited to the short TTI system.

In the embodiment, the base station sends DCI to a user equipment (UE) or the terminal to indicate the UE whether transmitting the DMRS or not. The base station here may be a NodeB (NB), an eNB and the like. The present embodiment is described with taking the eNB as an example. The indication here may be an indication bit in the DCI. "1" represents transmitting the DMRS and "0" represents not transmitting the DMRS. The indication may also be implemented in other manners. For example, the DCI includes a field for indicate whether transmitting the DMRS and other information. The other information here may be information on a relationship of positions of the DMRS and data. Some states in the field represent not transmitting the DMRS and some states represent transmitting the DMRS. The indication manner is not limited in the embodiments of the present invention and is applicable to all the methods in the embodiments.

Alternatively, when the UE receives the DCI that schedules the UE to transmit a PUSCH on TTI#n (n is a positive integer), if the DCI instructs the UE to transmit the DMRS on TTI#n, the UE needs to transmit the DMRS on TTI#n; if the DCI instructs the UE not to transmit the DMRS on TTI#n, the UE needs to make the following judgment.

If the UE transmitted a PUSCH (or DMRS) in a time window previous to the TTI#n, the UE does not transmit the DMRS on TTI#n.

If the UE did not transmit any PUSCH (or DMRS) in the time window previous to the TTI#n, the UE transmits the DMRS on TTI#n.

Figure 8:
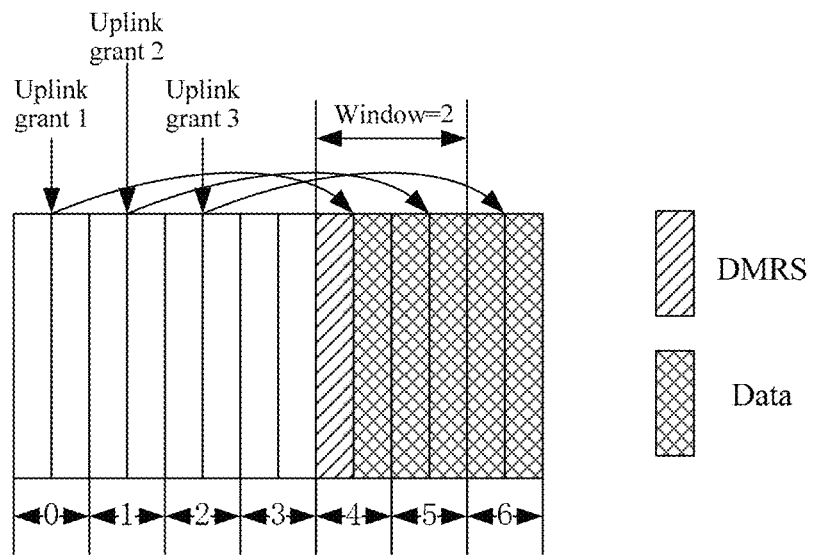
FIG. 8 is a schematic diagram 1 of uplink grant transmission according to an embodiment of the present invention.

An example is described below. FIG. 8 is a schematic diagram 1 illustrating the uplink grant transmission according to an embodiment of the present invention. As shown in FIG. 8, a subframe is divided into 7 TTIs, each TTI includes 2 symbols, and one time window includes 2 TTIs. The eNB continuously schedules 3 PUSCHs. An uplink grant 1 indicates transmitting the DMRS, and uplink grants 2 and 3 indicate not transmitting the DMRS. The uplink grant indicates not transmitting the DMRS on TTI#6. For TTI#6, the window includes 2 TTIs, which are TTI#4 and TTI#5 respectively. After the UE receives the uplink grant 3, the UE learns that the eNB instructs the UE not to transmit the DMRS. The UE checks the time window and finds that 2 PUSCHs were transmitted respectively on TTI#4 and TTI#5 in the time window, which indicates that the UE does not miss the uplink grant sent by the base station, so the UE will not transmit the DMRS on TTI#6.

Figure 9:
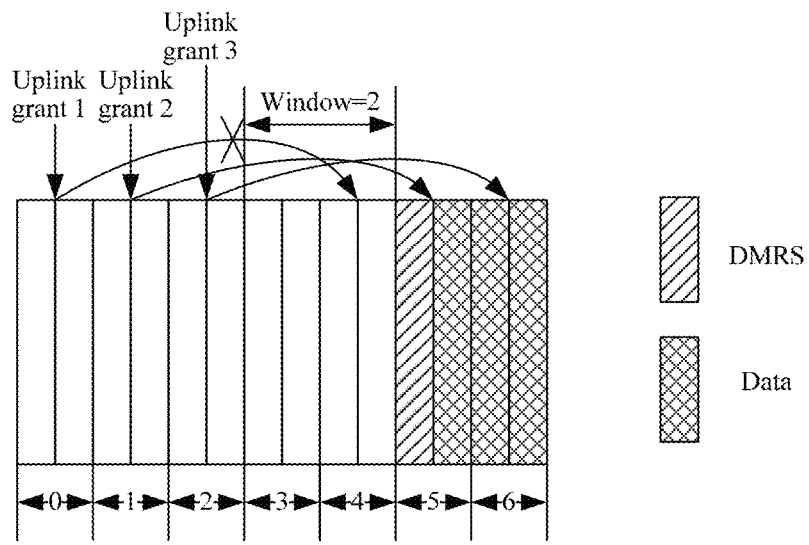
FIG. 9 is a schematic diagram 2 of uplink grant transmission according to an embodiment of the present invention.

FIG. 9 is a schematic diagram 2 illustrating the uplink grant transmission according to an embodiment of the present invention. As shown in FIG. 9, when the UE misses the uplink grant 1 and only receives the uplink grants 2 and 3. The uplink grant indicates transmitting the DMRS on TTI #5 and the corresponding time window includes TTI#3 and TTI#4. The UE finds that no PUSCH was transmitted in the time window, the UE will transmit the DMRS on TTI #5. In this way, a case where the DMRS is not transmitted since the UE misses the uplink grant 1 is avoided.

For the eNB, when the eNB instructs the UE to transmit the DMRS on TTI#n, the eNB knows that the UE will transmit the DMRS. When the eNB instructs the UE not to transmit the DMRS, if the eNB finds that the UE did not transmit the PUSCH in the time window before TTI#n, the eNB determines that the UE will transmit the DMRS on TTI#n; if the eNB finds that the UE has transmitted the PUSCH in the time window before TTI#n, the eNB determines that the UE will only transmit the data without transmitting the DMRS on TTI#n.

Alternatively, when the UE receives the DCI for scheduling the UE to transmit the PUSCH on TTI#n, if the DCI instructs the UE to transmit the DMRS on TTI#n, the UE needs to transmit the DMRS on TTI#n; if the DCI instructs the UE not to transmit the DMRS on TTI#n, the UE needs to make the following judgment.

If the PUSCH (or the DMRS) was transmitted within the time window previous to TTI#n, the UE will not transmit the DMRS on TTI#n.

If the PUSCH (or the DMRS) was not transmitted within the time window previous to TTI#n, the UE does not transmit any signal on TTI#n.

As shown in FIG. 9, the US misses the uplink grant 1 and only receives the uplink grants 2 and 3. The time window corresponding to TTI#5 includes TTI#3 and TTI#4. If the UE finds that the PUSCH was not transmitted in the time window, the UE does not transmit the DMRS or data on TTI #5. Similarly, the UE also does not transmit the DMRS or data on TTI #6. In this way, the UE may be prevented from transmitting unnecessary signals. Without the DMRS, even if the UE transmits data to the eNB, the eNB cannot demodulate the data transmitted by the UE.

For the eNB, in the case where the eNB indicates the UE transmitting the DMRS on TTI#n, the eNB knows that the UE will transmit the DMRS. In the case where the eNB indicates the UE not transmitting the DMRS, if the eNB finds that the UE does not transmit the PUSCH in the time window, the eNB determines that the UE will not transmit the DMRS or data on TTI#n; if the eNB finds that the UE has transmitted the PUSCH in the time window, the eNB determines that the UE does not transmit the DMRS and only transmits the data on TTI#n.

Alternatively, the size of the time window may be configured by the eNB or may also be preset. For example, the size of the time window is notified through signaling in band (SIB) or a radio resource control (RRC) protocol or the downlink control information (DCI), which is not limited in the embodiment. The description here is applicable to all the embodiments of the present invention.

The time window in the embodiments of the present invention may be in units of TTIs or symbols, and for example, may be 2 TTIs or 5 symbols.

Alternatively, a position for transmitting the DMRS may be preset or may also be notified by the eNB. For example, the position may be preset to be a first symbol in a scheduled TTI.

The methods in the embodiments of the present invention may be applied to a scenario where the TTI configuration is completed. As shown in FIG. 8, the subframe is divided into 7 TTIs, and each TTI may have a same size or may have a different size. For example, some TTIs each include 2 symbols and some TTIs each include 3 symbols, which is not limited in the embodiment. The methods in the embodiment may also be applied to a scenario where the TTIs are flexibly scheduled. The description here is applicable to all the embodiments of the present invention.

The method in the embodiment may also be expressed as follows:

When the UE receives the DCI that schedules the UE to transmit the PUSCH on TTI#n, if the DCI indicates the UE transmitting the DMRS, the UE needs to transmit the DMRS on TTI#n; if the DCI indicates the UE not transmitting the DMRS, the UE needs to make the following judgment.

If the uplink grant was received within a time window previous to the TTI where the DCI is located, the UE does not transmit the DMRS on TTI#n.

If the uplink grant was not received within the time window previous to the TTI where the DCI is located, the UE transmits the DMRS on TTI#n.

The method in the embodiment may also be expressed as follows:

When the UE receives the DCI that schedules the UE to transmit the PUSCH on TTI#n, if the DCI indicates the UE transmitting the DMRS, the UE needs to transmit the DMRS on TTI#n; if the DCI indicates the UE not transmitting the DMRS, the UE needs to make the following judgment.

If the uplink grant was received within the time window previous to the TTI where the DCI is located, the UE does not transmit the DMRS and only transmits data on TTI#n.

If the uplink grant was not received within the time window previous to the TTI where the DCI is located, the UE transmits no DMRS and no data on TTI#n.

In the embodiments of the present invention, the configuration of uplink TTI and the configuration of downlink TTI are the same, for example, both the uplink TTI and downlink TTI include 2 symbols. The methods in the present invention may also be applied to a case where the configuration of uplink TTI and the configuration of downlink TTI are different, for example, the uplink TTI includes 7 symbols and the downlink TTI includes 2 symbols.

Alternatively, the following manner may also be adopted:

When the UE receives the DCI for scheduling the UE to transmit the PUSCH on TTI#n, if the DCI indicates the UE transmitting the DMRS, the UE needs to transmit the DMRS on TTI#n; if the DCI indicates the UE not transmitting the DMRS, the UE needs to make the following judgment.

If the uplink grants were received within the time window previous to the TTI where the DCI is located and at least one of the received uplink grants indicates transmitting the DMRS, the UE does not transmit the DMRS and only transmits data on TTI#n.

If no uplink grant was received within the time window previous to the TTI where the DCI is located, or the uplink grant was received within the time window previous to the TTI where the DCI is located and none of the received uplink grant indicates transmitting DMRS, the UE transmits the DMRS on TTI#n, or transmits no DMRS and no data on TTI#n.

In the embodiments of the present invention, the configuration of uplink TTI and the configuration of downlink TTI are the same, for example, both the uplink TTI and downlink TTI include 2 symbols. The methods in the present invention may also be applied to a case where the configuration of uplink TTI and the configuration of downlink TTI are different, for example, the uplink TTI includes 7 symbols and the downlink TTI includes 2 symbols.

The embodiment provides a DMRS transmission method to avoid the following problem. If the terminal misses the uplink grant instructing to transmit a DMRS, the terminal will not transmit the DMRS on next few TTIs, and accordingly the eNB cannot perform demodulation and resources are wasted.

The embodiment is described by taking a system with short TTI as an example. It is to be noted that the method in the embodiment is not limited to the short TTI technology.

In the embodiment, DCI includes an indication bit, and whether to transmit a DMRS or not is indicated by whether the indication bit is flipped or not. For example, the indication bit is flipped when the DMRS needs to be transmitted and the indication bit is unchanged when no DMRS needs to be transmitted. Alternatively, the indication bit is unchanged when the DMRS needs to be transmitted and the indication bit is flipped when no DMRS needs to be transmitted.

Described below is an example in which the indication bit is flipped when the DMRS needs to be transmitted and the indication bit is unchanged when no DMRS needs to be transmitted.

Alternatively, when the UE receives the DCI that schedules the UE to transmit a PUSCH on TTI#n, if the UE did not transmit PUSCH within a time window previous to TTI#n, the UE transmits the DMRS on TTI#n; if the UE transmitted a PUSCH within the time window previous to TTI#n, the UE needs to make the following judgment.

It is assumed that a TTI, where the PUSCH closest to TTI#n is located, in the time window is TTI#n-k, where k is a positive integer less than n. If the indication bit in the DCI corresponding to TTI#n is not flipped with respect to the indication bit in DCI corresponding to TTI#n-k, the UE does not transmit the DMRS on TTI#n.

If the indication bit in the DCI corresponding to TTI#n is flipped with respect to the indication bit in the DCI corresponding to TTI#n-k, the UE transmits the DMRS on TTI#n.

As shown in FIG. 9, the time window includes 2 TTIs. The eNB continuously schedules 3 PUSCHs. It is assumed that indication bits of two uplink grants are both 1. When the UE misses an uplink grant 1 and only receives an uplink grant 2 and an uplink grant 3, the UE determines whether the PUSCH was transmitted within the window in FIG. 9. The UE transmits the DMRS on TTI#5 in response to determining that the PUSCH was not transmitted.

In the above example, for TTI#5, the eNB originally indicates not transmitting the DMRS while the DMRS is transmitted, so the number of symbols in data transmission becomes smaller. To ensure performance, a transport block set (TBS) on TTI#5 may be reduced according to a preset rule, for example, $n_{PRB}=\lceil N_{PRB}*(N_{TTI}-N_{DMRS})/N_{TTI}\rceil$, where $N_{PRB}$ is the number of allocated physical resource blocks (PRBs), is the number of symbols in the scheduled TTI, $N_{DMRS}$ is the number of symbols of the transmitted DMRS and $n_{PRB}$ is the number of PRBs corresponding to the TBS. Alternatively, the preset rule may be $n_{PRB}=\lfloor N_{PRB}*(N_{TTI}-N_{DMRS})/N_{TTI}\rfloor$. The method is also applicable to other embodiments of the present invention.

Alternatively, when the UE receives the DCI for scheduling the UE to transmit the PUSCH on TTI#n, if the PUSCH was not transmitted within the time window previous to TTI#n, the UE transmits the DMRS on TTI#n; if the PUSCH was transmitted within the time window previous to TTI#n, the UE needs to make the following judgment.

Assuming that the TTI, where the PUSCH closest to TTI#n is located, in the time window is TTI#n-k, if the indication bit in the DCI corresponding to TTI#n is not flipped with respect to the indication bit in the DCI corresponding to TTI#n-k, the UE does not transmit the DMRS and only transmits data on TTI#n.

If the indication bit in the DCI corresponding to TTI#n is flipped with respect to the indication bit in the DCI corresponding to TTI#n-k, the UE does not transmit the DMRS or data on TTI#n.

Alternatively, a size of the time window is configured by the eNB or is preset. For example, the size of the time window is notified through SIB or RRC or the DCI.

The size of the time window may be in units of TTIs or symbols. For example, the time window may be 2 TTIs or 5 symbols.

Alternatively, a position for transmitting the DMRS may be preset or may also be notified by the eNB.

For the eNB, if the PUSCH is not scheduled within the time window previous to TTI#n, the eNB knows that the UE will transmit the DMRS on TTI#n.

If the PUSCH is scheduled within the time window previous to TTI#n, TTIs in the time window need to be checked. If no PUSCH is scheduled within the time window, the eNB knows that the UE will transmit the DMRS on TTI#n. If the PUSCH is scheduled in the time window, the indication bit in the last received uplink grant corresponding to a PUSCH within the time window is compared with the indication bit in the uplink grant corresponding to TTI#n to determine whether the UE transmits the DMRS on TTI#n.

The method in the embodiment may also be described as follows:

When the UE receives the DCI for scheduling the UE to transmit the PUSCH on TTI#n, if uplink scheduling is not received within the time window previous to the TTI where the DCI is located, the UE needs to transmit the DMRS on TTI#n; if the uplink scheduling is received within the time window previous to the TTI where the DCI is located, the UE needs to make the following judgement.

If the indication bit in the DCI is not flipped with respect to an indication bit of the uplink scheduling closest to the DCI within the time window, the DMRS is not transmitted on TTI#n.

If the indication bit in the DCI is flipped with respect to the indication bit of the uplink scheduling closest to the DCI within the time window, the DMRS is transmitted on TTI#n.

Alternatively, the method may also be described as follows:

When the UE receives the DCI for scheduling the UE to transmit the PUSCH on TTI#n, if the UE did not receive the uplink scheduling within the time window previous to the TTI where the DCI is located, the UE needs to transmit the DMRS on TTI#n; if the UE received the uplink scheduling within the time window previous to the TTI where the DCI is located, the UE needs to make the following judgement.

If the indication bit in the DCI is not flipped with respect to the indication bit of the uplink scheduling closest to the DCI within the time window, the UE does not transmit the DMRS on TTI#n.

If the indication bit in the DCI is flipped with respect to the indication bit of the uplink scheduling closest to the DCI within the time window, the UE does not transmit DMRS or data on TTI#n.

The embodiment further provides a DMRS transmission method to avoid the following problem. If the terminal misses the uplink grant indicating the terminal transmitting the DMRS, the terminal will not transmit the DMRS on next few TTIs, causing that the eNB cannot demodulate data and resources are wasted.

The embodiment is described by taking a system with short TTI as an example. The method in the embodiment is not limited to the short TTI technology.

In the case shown in FIG. 8 where the PUSCHs are continuously scheduled, if the position of the DMRS is indicated the an uplink scheduling grant, even if the UE misses the uplink grant 1, the UE can still learn the position of the DMRS after receiving the DMRS. However, the time interval between an uplink grant 2 and the DMRS is short, which may exceed a practical processing capability of a UE.

A solution is given below and is not limited to the preceding scenario.

Alternatively, when the UE receives an uplink grant and a time difference (time interval) between data and the DMRS indicated in the uplink grant exceeds a threshold, the UE will transmit the DMRS on one of data symbols and not transmit the DMRS or data at the DMRS position indicated by the eNB. The symbol for transmitting the DMRS may be preset, such as the first data symbol. Here, the time interval may be defined as a time difference between an ending position for transmitting the DMRS and a starting position for transmitting the data. Alternatively, the time interval may be defined as a time difference between a starting position for transmitting the DMRS and the starting position for transmitting the data. Alternatively, the time interval be defined as a time difference between the ending position for transmitting the DMRS and an ending position for transmitting the data.

Alternatively, when the UE receives the uplink grant and a time difference between the DMRS indicated in the uplink grant and the uplink grant is less than a threshold, the UE will transmit the DMRS on one of data symbols and not transmit the DMRS or data at the DMRS position indicated by the eNB. The one symbol for transmitting the DMRS may be preset, such as the first data symbol. Here, the time interval may be defined as a time difference between the ending position for transmitting the DMRS and a starting position of a TTI where the uplink grant is located. Alternatively, the time interval may be defined as a time difference between the starting position for transmitting the DMRS and the starting position of the TTI where the uplink grant is located. Alternatively, the time interval may be defined as a time difference between the ending position for transmitting the DMRS and an ending position of the TTI where the uplink grant is located.

For the eNB, if the eNB finds that the UE does not transmit the DMRS at the indicated DMRS position, the eNB determines that the UE will transmit the DMRS on the data symbol.

Alternatively, when the UE receives the uplink grant and the time difference between the DMRS indicated by the uplink grant and the data exceeds a threshold, the UE will discard the transmission.

Alternatively, when the UE receives the uplink grant and the time difference between the DMRS indicated in the uplink grant and the uplink grant is less than a threshold, the UE will discard the transmission.

Alternatively, the threshold is preset or notified by the eNB. For example, the threshold is notified through RRC or SIB.

Alternatively, the threshold may be in units of TTIs or symbols.

Figure 10:
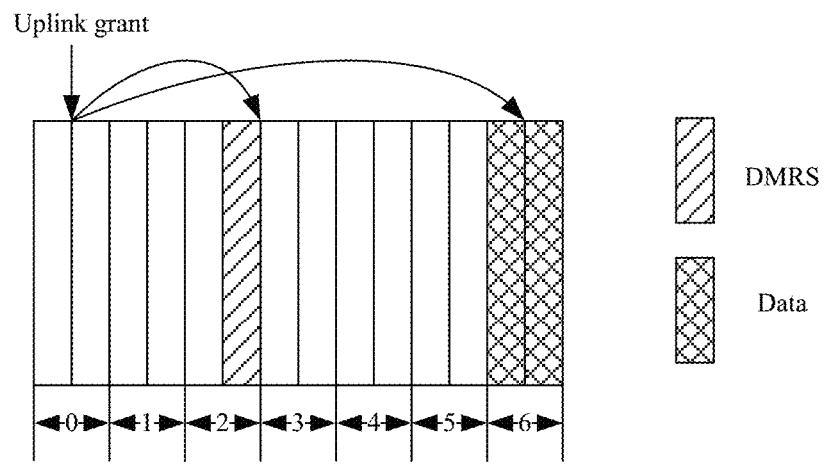
FIG. 10 is a schematic diagram 3 of uplink grant transmission according to an embodiment of the present invention.

FIG. 10 is a schematic diagram 3 illustrating the uplink grant transmission according to an embodiment of the present invention. It is assumed that the threshold is 4 TTIs. As shown in FIG. 10, an uplink grant on TTI#0 schedules the UE to transmit the PUSCH and indicates that the DMRS is to be transmitted on TTI#2 and the data is to be transmitted on TTI#6. The time interval between the TTI for transmitting the DMRS and the TTI for transmitting the uplink grant is 2 TTIs. The UE does not transmit the DMRS at the indicated DMRS position in TTI#2 and transmits the DMRS on a first symbol of TTI#6; alternatively, the UE discards the transmission and transmits no signal at both the indicated DMRS position and the indicated data position.

The embodiment further provides a DMRS transmission method to avoid the following problem. If the terminal misses an uplink grant indicating transmitting a DMRS, the UE will not transmit the DMRS on next few TTIs, and therefore the eNB cannot perform demodulation and resources are wasted.

The embodiment is described by taking a short TTI system as an example. The method in the embodiment is not limited to a short TTI technology.

A candidate time domain position for transmitting the DMRS is preset or notified by the eNB through RRC signaling or SIB signaling, such as 0, 4 and 8 in one symbol.

Alternatively, starting from a radio frame #0, candidate positions of the DMRS are uniformly distributed. For example, a density of the candidate positions is ¼. That is, there is one candidate DMRS position every 4 symbols, and the density is preset or indicated by the eNB.

If the eNB schedules the UE to transmit the PUSCH on a TTI and the TTI includes one of the candidate DMRS positions, the DMRS is transmitted at the one of the candidate positions.

Alternatively, if the TTI does not include the candidate DMRS position, the UE determines whether the DMRS was transmitted in the time window. If the UE did not transmit the DMRS in the time window, the UE transmits the DMRS. If the UE transmitted the DMRS in the time window, the UE does not transmit the DMRS.

Alternatively, if the TTI does not include the candidate DMRS position, the UE does not transmit the DMRS.

Figure 11:
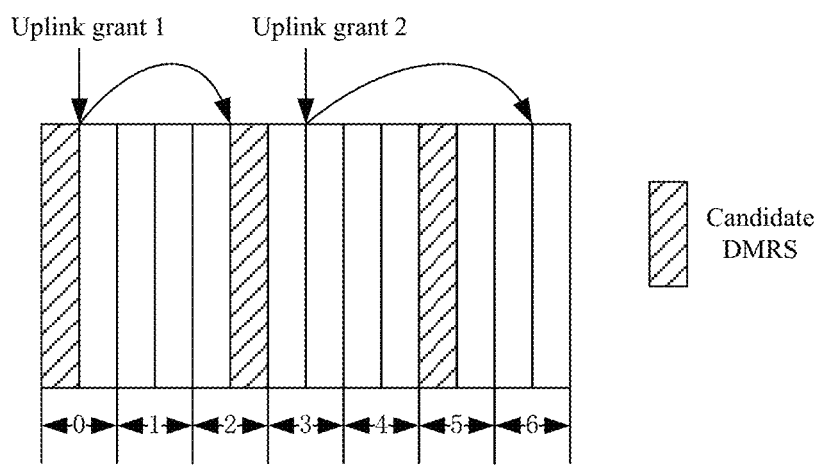
FIG. 11 is a schematic diagram 4 of uplink grant transmission according to an embodiment of the present invention.

FIG. 11 is a schematic diagram 4 illustrating the uplink grant transmission according to an embodiment of the present invention. For example, as shown in FIG. 11, an uplink grant 1 schedules the UE to transmit the DMRS on TTI#2 and an uplink grant 2 schedules the UE to transmit the DMRS on TTI#6. Since the TTI#2 includes the candidate DMRS position, the data is transmitted on the first symbol of TTI#2 and the DMRS is transmitted on the second symbol of TTI#2. Since is the TTI#6 does not include the candidate DMRS position, the UE only transmits the data on TTI#6, alternatively, the UE checks whether the DMRS is transmitted within the time window before TTI#6. For example, the time window includes 2 TTIs, TTI#4 and TTI#5, and the DMRS is not transmitted within the time window, so the UE will transmit the DMRS in TTI#6, for example, transmit the DMRS on the first symbol of TTI#6.

Alternatively, a size of the time window is configured by the eNB or is preset. For example, the size of the time window is notified through SIB or RRC or DCI.

Alternatively, the size of the time window may be in units of TTIs or symbols. For example, the time window may include 2 TTIs or 5 TTIs.

Alternatively, the position for transmitting the DMRS may be preset or notified by the eNB.

The embodiment further provides a method for indicating DMRS transmission, and the method is performed by an eNB.

The embodiment is described by taking a short TTI system as an example. The method in the embodiment is not limited to a short TTI technology.

The eNB transmits DCI, and the DCI schedules a UE to transmit a PUSCH on a specified TTI. If the eNB does not transmitted an uplink grant which schedules the UE to transmit the PUSCH within a specified time window, or if the eNB has transmitted the uplink grant which schedules the UE to transmit the PUSCH within the specified time window and the uplink grant instructs the UE not to transmit the DMRS, the eNB instructs, through the DCI, the UE to transmit the DMRS.

If the eNB has transmitted the uplink grant which schedules the UE to transmit the PUSCH within the specified time window and the uplink grant instructs the UE to transmit the DMRS, the eNB instructs, through the DCI, the UE not to transmit the DMRS.

The specified time window is located before the specified TTI.

Figure 12:
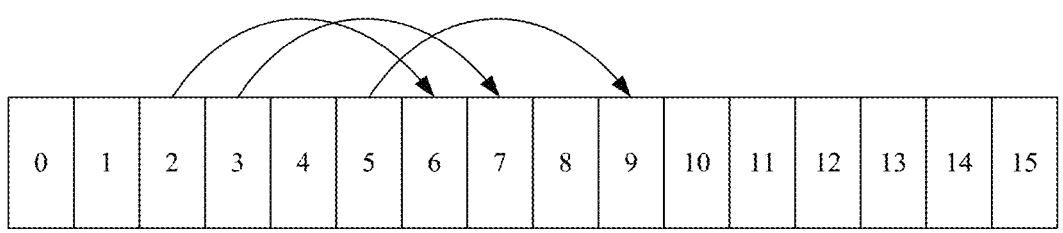
FIG. 12 is a schematic diagram 5 of uplink grant transmission according to an embodiment of the present invention.

FIG. 12 is a schematic diagram 5 illustrating the uplink grant transmission according to an embodiment of the present invention. It is assumed that a window length on the eNB side is 2 TTIs. In FIG. 12, each block represents one TTI. The eNB transmits DCI on TTI#2, TTI#3 and TTI#5 to schedule the UE to transmit PUSCHs on TTI#6, TTI#7 and TTI#9. For TTI#6, the window includes two TTIs, TTI#4 and TTI#5. Since the UE is not scheduled to transmit the PUSCH on TTI#4 and TTI#5, the eNB will instruct the UE to transmit the DMRS on TTI#6. For TTI#7, the window includes two TTIs, TTI#5 and TTI#6. Since the UE is instructed to transmit the DMRS on TTI#6, the eNB will instruct the UE not to transmit the DMRS on TTI#7. For TTI#9, the window includes two TTIs, TTI#7 and TTI#8. Since the eNB schedules the UE to transmit the PUSCH only in TTI#7 and instructs the UE not to transmit the DMRS, the eNB will instruct the UE to transmit the DMRS on TTI#9.

The above method may also be described as follows:

The eNB transmits the DCI to the UE to schedule the UE to transmit the PUSCH on the specified TTI. Within the time window before the specified TTI where the DCI is located, if the eNB does not schedule the UE, that is, the eNB does not transmit the uplink grant, or the eNB has scheduled the UE and instructed the UE not to transmit the DMRS, the eNB instructs the UE to transmit the DMRS on the specified TTI. Within the time window before the specified TTI, if the eNB has transmitted the DCI for uplink scheduling to the UE and instructed the UE to transmit the DMRS, the eNB instructs the UE not to transmit the DMRS in the DCI.

As shown in FIG. 12, it is assumed that the window includes 2 TTIs. For TTI#2, the corresponding time window includes TTI#0 and TTI#1. In TTI#0 and TTI#1, the eNB does not transmit the uplink grant to the UE, and therefore the eNB instructs the UE to transmit the DMRS on TTI#2. For TTI#3, the corresponding time window includes TTI#1 and TTI#2. In TTI#2, the eNB transmits the uplink grant to the UE and instructs the UE to transmit the DMRS, and therefore the eNB instructs the UE not to transmit the DMRS on TTI#3. For TTI#5, the corresponding time window includes TTI#3 and TTI#3. On TTI#3, the eNB transmits the uplink grant to the UE and instructs the UE to not transmit the DMRS, and therefore the eNB instructs the UE to transmit the DMRS on TTI#5.

Alternatively, the eNB may indicate whether to transmit the DMRS by using 1 bit in the DCI. Alternatively, the eNB may indicate whether to transmit the DMRS by indicating whether a bit is flipped by using 1 bit.

An embodiment of the present invention further provides a storage medium. Optionally, in the present embodiment, the storage medium may be configured to store program codes for executing the PUSCH transmission method in the embodiments described above.

Alternatively, in the embodiment, the storage medium may be located in any one of a group of mobile terminals in a computer network, or located in any one of a group of mobile terminals.

Alternatively, in the present embodiment, the storage medium is configured to store program codes for executing the steps described below.

In step S1, a transmission manner of a PUSCH is determined according to at least one of an indication of first downlink control information (DCI) received from a base station or a first preset condition.

In step S2, the PUSCH is transmitted in the determined transmission manner.

An embodiment of the present invention further provides a storage medium. Optionally, in the present embodiment, the storage medium may be configured to store program codes for executing the DCI indication method in the embodiments described above.

Alternatively, in the embodiment, the storage medium is configured to store program codes for executing the steps described below.

In step S1, a content of sixth DCI is determined according to a second preset condition. The sixth DCI is used for instructing a terminal to transmit a physical uplink shared channel (PUSCH) in a specified transmission manner.

In step S2, the determined sixth DCI is transmitted to the terminal.

The serial numbers of the embodiments described above in the present invention are merely for ease of description and do not indicate superiority and inferiority of the embodiments.

In the embodiments described above of the present invention, the description of each embodiment has its own emphasis. For a part not described in detail in one embodiment, reference may be made to a related description of another embodiment.

It should be understood that the technical content disclosed in the embodiments of the present invention may be implemented in other ways. The device embodiments described above are merely illustrative. For example, the unit division is merely based on logical functions, and, in practice, the unit division may be implemented in other ways. For example, multiple units or components may be combined or may be integrated into another system, or some features may be ignored or not executed. Additionally, the presented or discussed mutual coupling, direct coupling or communication connections may be indirect coupling or communication connections via interfaces, units or modules, or may be electrical or in other forms.

The units described above as separate components may or may not be physically separated. Components presented as units may or may not be physical units, i.e., may be located in one place or may be distributed on multiple network units. Part or all of these units may be selected according to practical requirements to achieve objects of the solutions in the embodiments of the present invention.

Additionally, various functional units in each embodiment of the present invention may be integrated into one processing unit, or each unit may be physically present separately, or two or more units may be integrated into one unit. The integrated unit may be implemented by hardware or a software functional unit.

It should be understood by those skilled in the art that functional modules/units in all or part of the steps of the method, the system and the device disclosed above may be implemented as software, firmware, hardware and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a RAM, a ROM, an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other medium used for storing desired information and accessed by a computer. In addition, as is known to those skilled in the art, the communication medium generally includes the computer-readable instructions, the data structures, the program modules, or other data in modulated data signals such as carriers or other transmission mechanisms, and may include any information delivery media. The above are only optional embodiments of the present invention and are not intended to limit the present invention, and for those skilled in the art, the present invention may have various modifications and variations. Any modifications, equivalent substitutions, improvements and the like made within the spirit and principle of the present invention should fall within the scope of the present invention.

INDUSTRIAL APPLICABILITY

When the terminal misses the uplink grant of the PUSCH sent by the base station and thus the eNB cannot perform the demodulation, by using the embodiments described above, the terminal can determine the transmission manner of the PUSCH according to the DCI or the preset condition so that the base station may perform the demodulation successfully, avoiding wasting the resources.

What is claimed is:

1. A method for transmitting a physical uplink shared channel (PUSCH), comprising:
   determining a transmission manner of the PUSCH according to at least one of: an indication of first downlink control information (DCI) received from a base station or a first preset condition; and
   transmitting the PUSCH in the determined transmission manner;
   wherein the indication of the first DCI comprises:
      a first indication, indicating that a reference signal is to be transmitted on a specified transmission time interval (TTI); or
      a second indication, indicating that no reference signal is to be transmitted on the specified TTI; or
      a third indication, indicating that the PUSCH is to be transmitted on the specified TTI; or
      a fourth indication, indicating that the reference signal is to be transmitted on a specified symbol; and
   wherein in response to determining that the indication of the first DCI is the second indication, the determining the transmission manner of the PUSCH comprises: determining the transmission manner of the PUSCH according to the first preset condition.

2. The method of claim 1, wherein in response to determining that the indication of the first DCI is the fourth indication, the determining the transmission manner of the PUSCH comprises:
   determining the transmission manner of the PUSCH according to the first preset condition.

3. The method of claim 2, wherein the determining the transmission manner of the PUSCH according to the first preset condition comprises:
   in response to determining that the specified symbol is before a first data transmission symbol,
   in response to determining that a time interval between the specified symbol and the first data transmission symbol exceeds a first threshold, determining that the transmission manner of the PUSCH comprises: the reference signal is not to be transmitted on the specified symbol and is to be transmitted on at least one data transmission symbol; or the reference signal is not to be transmitted on the specified symbol and no data is to be transmitted on data transmission symbols;

wherein the first threshold comprises one of: N1 TTIs, N2 uplink TTIs, N3 downlink TTIs or N4 symbols, wherein N1, N2, N3 and N4 are all positive integers.

4. The method of claim 2, wherein the determining the transmission manner of the PUSCH according to the first preset condition further comprises:

in response to determining that a time interval between a TTI where the first DCI is located and the specified symbol is less than a second threshold, determining that the transmission manner of the PUSCH comprises: the reference signal is not to be transmitted on the specified symbol and is to be transmitted on at least one data transmission symbol; or the reference signal is not to be transmitted on the specified symbol and is not to be transmitted on data transmission symbols;

wherein the second threshold comprises one of: M1 TTIs, M2 uplink TTIs, M3 downlink TTIs or M4 symbols, wherein M1, M2, M3 and M4 are all positive integers.

5. The method of claim 1, wherein the determining the transmission manner of the PUSCH according to the first preset condition comprises:

in response to determining that a PUSCH was transmitted within a time window previous to the specified TTI, determining that the transmission manner of the PUSCH comprises: no reference signal is to be transmitted on the specified TTI; and in response to determining that no PUSCH was transmitted within the time window previous to the specified TTI, determining that the transmission manner of the PUSCH comprises: the reference signal is to be transmitted on the specified TTI, or neither the reference signal nor data is to be transmitted on the specified TTI.

6. The method of claim 1, wherein the determining the transmission manner of the PUSCH according to the first preset condition further comprises:

in response to determining that the reference signal was transmitted within a time window previous to the specified TTI, determining that the transmission manner of the PUSCH comprises: no reference signal is to be transmitted on the specified TTI; and in response to determining that the reference signal was not transmitted within the time window previous to the specified TTI, determining that the transmission manner of the PUSCH comprises: the reference signal is to be transmitted on the specified TTI, or neither the reference signal nor data is to be transmitted on the specified TTI.

7. The method of claim 1, wherein the determining the transmission manner of the PUSCH according to the first preset condition further comprises:

in response to determining that an uplink grant sent by the base station was received within a time window previous to a TTI where the first DCI is located, determining that the transmission manner of the PUSCH comprises: no reference signal is to be transmitted on the specified TTI; and in response to determining that the uplink grant sent by the base station was not received within the time window previous to the TTI where the first DCI is located, determining that the transmission manner of the PUSCH comprises: the reference signal is to be transmitted on the specified TTI, or neither the reference signal nor data is to be transmitted on the specified TTI.

8. The method of claim 1, wherein in response to determining that the indication of the first DCI is the third indication, the determining the transmission manner of the PUSCH comprises: determining the transmission manner of the PUSCH according to the first preset condition.

9. The method of claim 8, wherein the determining the transmission manner of the PUSCH according to the first preset condition further comprises:

in response to determining that the specified TTI comprises a candidate demodulation reference signal (DMRS) time domain position, determining that the transmission manner of the PUSCH comprises: the reference signal is to be transmitted at the candidate DMRS time domain position.

10. The method of claim 8, wherein the determining the transmission manner of the PUSCH according to the first preset condition comprises:

in response to determining that no PUSCH was transmitted within a time window previous to the specified TTI, determining that the transmission manner of the PUSCH comprises that the reference signal is to be transmitted on the specified TTI.

11. The method of claim 8, wherein determining the transmission manner of the PUSCH according to the first preset condition further comprises:

in response to determining that a PUSCH was transmitted within a time window previous to the specified TTI, in response to determining that an indication bit in the first DCI is flipped with respect to an indication bit in second DCI within the time window previous to the specified TTI, determining that the transmission manner of the PUSCH comprises: the reference signal is to be transmitted on the specified TTI, wherein the second DCI corresponds to a PUSCH transmitted within the time window previous to the specified TTI and closest to the specified TTI; and in response to determining that the indication bit in the first DCI is not flipped with respect to the indication bit in the second DCI within the time window previous to the specified TTI, determining that the transmission manner of the PUSCH comprises: no reference signal is to be transmitted on the specified TTI, or neither the reference signal nor data is to be transmitted on the specified TTI.

12. The method of claim 8, wherein the determining the transmission manner of the PUSCH according to the first preset condition further comprises:

in response to determining that the specified TTI comprises no candidate DMRS time domain position, in response to determining that the reference signal was transmitted within a time window previous to the specified TTI, determining that the transmission manner of the PUSCH comprises: no reference signal is to be transmitted on the specified TTI; and in response to determining that no reference signal was transmitted within the time window previous to the specified TTI, determining that the transmission manner of the PUSCH comprises: the reference signal is to be transmitted on the specified TTI, or neither the reference signal nor data is to be transmitted on the specified TTI.

13. The method of claim 8, wherein the determining the transmission manner of the PUSCH according to the first preset condition further comprises:
- in response to determining that no uplink grant sent by the base station was received within a time window previous to a TTI where the first DCI is located, determining that the transmission manner of the PUSCH comprises: the reference signal is to be transmitted on the specified TTI.

14. The method of claim 8, wherein the determining the transmission manner of the PUSCH according to the first preset condition further comprises:
- in response to determining that an uplink grant sent by the base station was received within a time window previous to a TTI where the first DCI is located,
- in response to determining that an indication bit in the first DCI is flipped with respect to an indication bit in fourth DCI within the time window previous to the TTI where the first DCI is located, determining that the transmission manner of the PUSCH comprises: no reference signal is to be transmitted on the specified TTI, wherein the fourth DCI is an uplink grant received within the time window and closest to the TTI where the first DCI is located; and
- in response to determining that the indication bit in the first DCI is not flipped with respect to the indication bit in the fourth DCI within the time window previous to the TTI where the first DCI is located, determining that the transmission manner of the PUSCH comprises: no reference signal is to be transmitted on the specified TTI, or neither the reference signal nor data is to be transmitted on the specified TTI.

15. The method of claim 8, wherein the determining the transmission manner of the PUSCH according to the first preset condition further comprises:
- in response to determining that an uplink grant sent by the base station was received within a time window previous to a TTI where the first DCI is located,
- in response to determining that an indication bit in the first DCI is flipped with respect to an indication bit in fifth DCI within the time window previous to the TTI where the first DCI is located, determining that the transmission manner of the PUSCH comprises: no reference signal is to be transmitted on the specified TTI, or neither the reference signal nor data is to be transmitted on the specified TTI; wherein the fifth DCI is an uplink grant received within the time window and closest to the TTI where the first DCI is located; and
- in response to determining that the indication bit in the first DCI is not flipped with respect to the indication bit in the fifth DCI within the time window previous to the TTI where the first DCI is located, determining that the transmission manner of the PUSCH comprises: no reference signal is to be transmitted on the specified TTI.

16. A terminal, comprising:
a processor; and
a memory, configured to store instructions executable by the processor;
wherein the processor is configured to perform, according to the instructions stored in the memory, the following operations:
determining a transmission manner of a physical uplink shared channel (PUSCH) according to at least one of an indication of first downlink control information (DCI) received from a base station and a first preset condition; and
transmitting the PUSCH in the determined transmission manner;
wherein the indication of the first DCI comprises:
- a first indication, indicating that a reference signal is to be transmitted on a specified transmission time interval (TTI); or
- a second indication, indicating that no reference signal is to be transmitted on the specified TTI; or
- a third indication, indicating that the PUSCH is to be transmitted on the specified TTI; or
- a fourth indication, indicating that the reference signal is to be transmitted on a specified symbol; and
wherein in response to determining that the indication of the first DCI is the second indication, the determining the transmission manner of the PUSCH comprises: determining the transmission manner of the PUSCH according to the first preset condition.

* * * * *